United States Patent [19]

Rohrberg

[11] Patent Number: 5,692,421

[45] Date of Patent: Dec. 2, 1997

[54] HIGH-PRECISION CUTTING TOOL SYSTEM

[76] Inventor: Roderick G. Rohrberg, 2742 W. 234th St., Torrance, Calif. 90505

[21] Appl. No.: 458,624

[22] Filed: Jun. 2, 1995

Related U.S. Application Data

[63] Continuation-in-part of Ser. No. 90,392, Jul. 9, 1993, Pat. No. 5,531,370, which is a continuation-in-part of Ser. No. 762,713, Sep. 19, 1991, abandoned, which is a continuation-in-part of Ser. No. 567,951, Aug. 14, 1990, abandoned.

[51] Int. Cl.$^6$ .................................................. B23B 27/00
[52] U.S. Cl. .................................. 82/1.2; 82/1.4; 82/1.5; 82/141
[58] Field of Search ................................ 82/1.2, 1.4, 1.5, 82/141; 408/153, 161, 162, 163, 164, 173

[56] References Cited

U.S. PATENT DOCUMENTS

| | | | |
|---|---|---|---|
| 3,710,659 | 1/1973 | Pagella et al. | 82/1.2 |
| 4,162,867 | 7/1979 | Calcaterra et al. | 408/173 X |
| 4,375,773 | 3/1983 | Liermann | 82/1.2 |
| 4,612,831 | 9/1986 | Lehmkuhl | 82/1.4 |
| 4,637,285 | 1/1987 | Mizoguchi | 82/1.2 X |
| 4,741,231 | 5/1988 | Patterson et al. | 82/141 X |
| 5,209,617 | 5/1993 | Heule | 408/173 X |

FOREIGN PATENT DOCUMENTS

| | | | |
|---|---|---|---|
| 21901 | 9/1958 | Germany | 408/153 |
| 0880636 | 11/1981 | U.S.S.R. | 408/153 |

*Primary Examiner*—Daniel W. Howell
*Assistant Examiner*—Henry W. H. Tsai
*Attorney, Agent, or Firm*—Anglin & Giaccherini

[57] ABSTRACT

The present invention solves the problems encountered by conventional machine tool devices when metals, plastics, composites or other materials are cut. The Sizing Tool is capable of precisely and permanently changing the shape of a tubular workpiece because, unlike conventional static spreaders, it repeatedly bends the workpiece back and forth many times to achieve the desired deformation. The Sizing Tool includes a set of revolving rollers (14) supported by bearings (13) and a mounting plate (12). The roller (14) is capable of engaging either the inside or outside surface of a hollow metal tube (10). The rollers (14) exert force on the end of the tube (10) having a circular cross-section in a configuration that resembles a polygon inscribed in a circle. As the rollers (14) are moved toward the workpiece (10), the workpiece is gradually deformed as it moves farther into the inclined surface presented by each roller (14). The dynamic flexure flaring method provided by the present invention enables a technician to work harden and produce precisely formed surfaces within a tolerance of one-thousandth of an inch which can be relied upon to maintain their shape over long periods of time. The Cutting Tool is controlled by an innovative tool advance assembly that converts translational motion to precise radial motion which governs the action of the cutting bit as it severs a tubular workpiece (10). The Cutting Tool is not only capable of cutting a tubular workpiece (10) from the inside out, but can also be configured to cut a tube (10) from the outside.

10 Claims, 34 Drawing Sheets

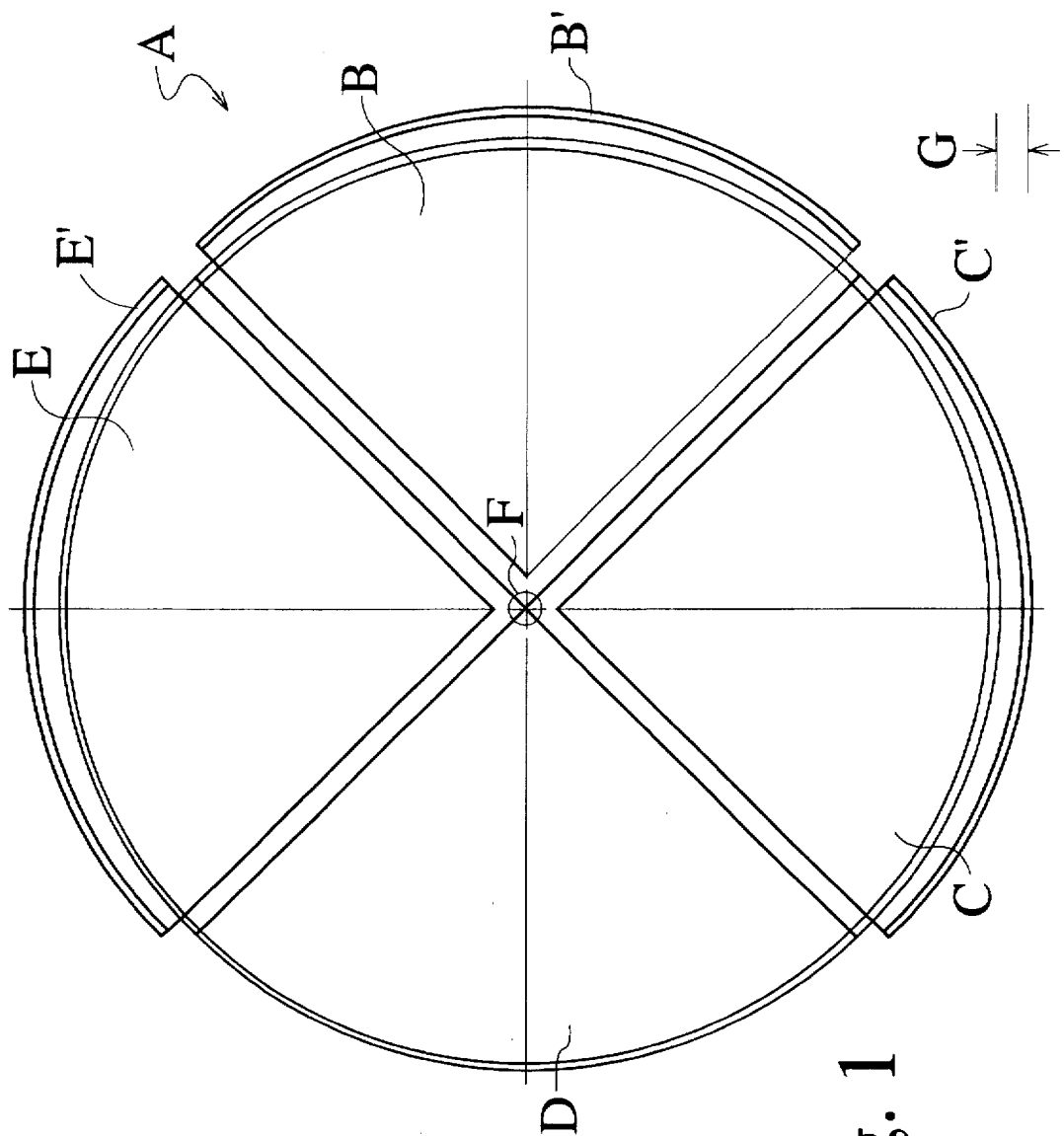

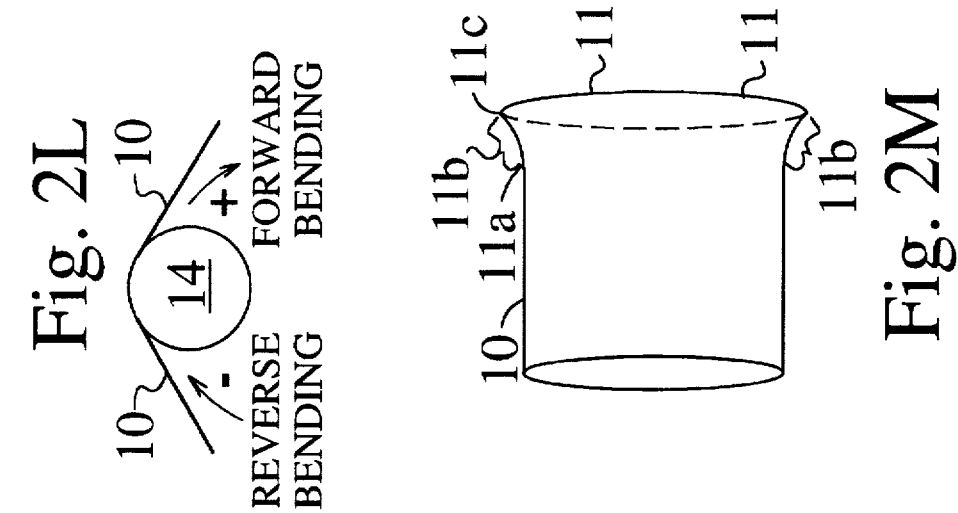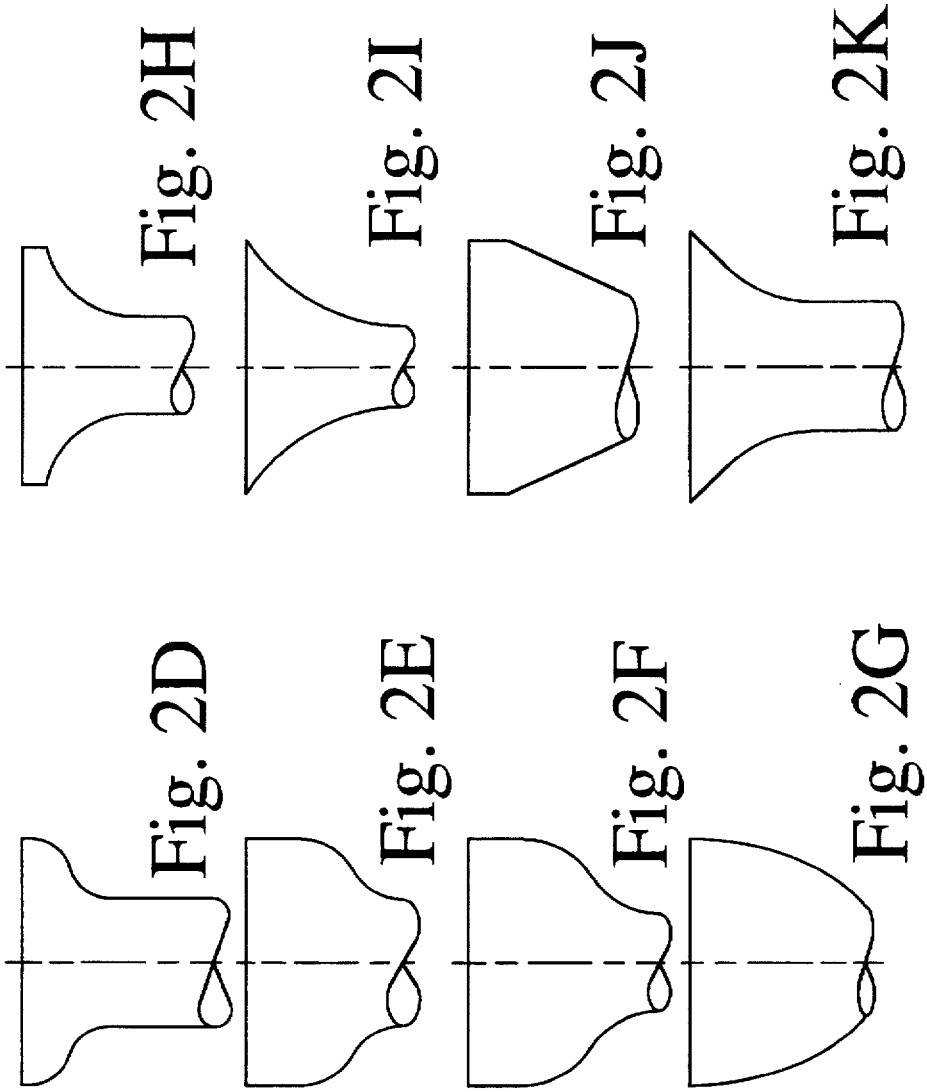

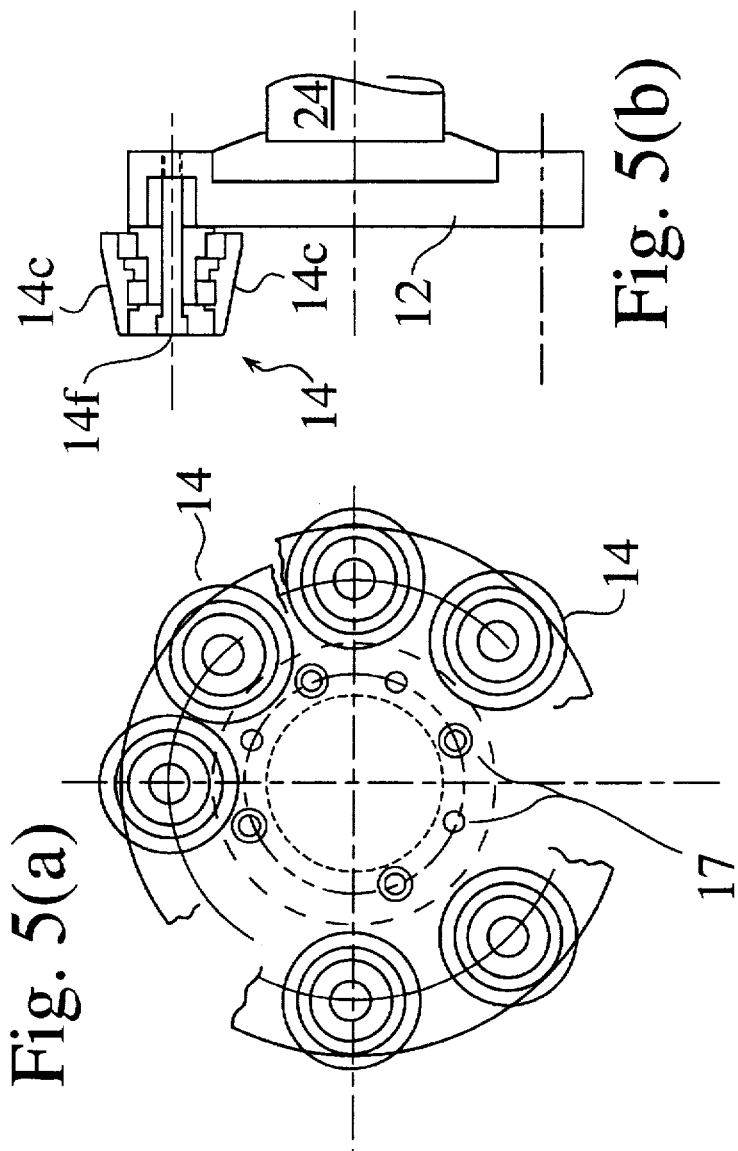
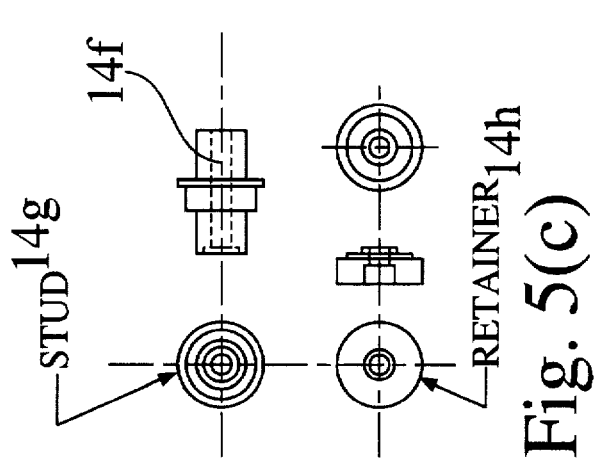
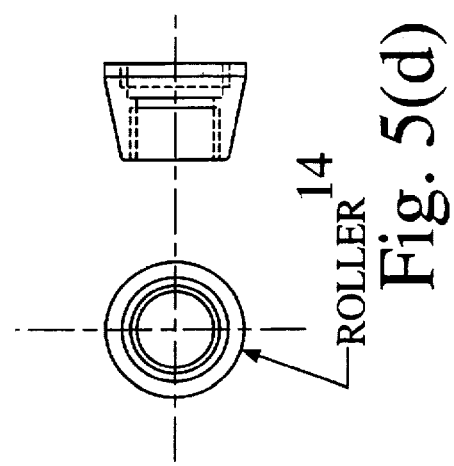

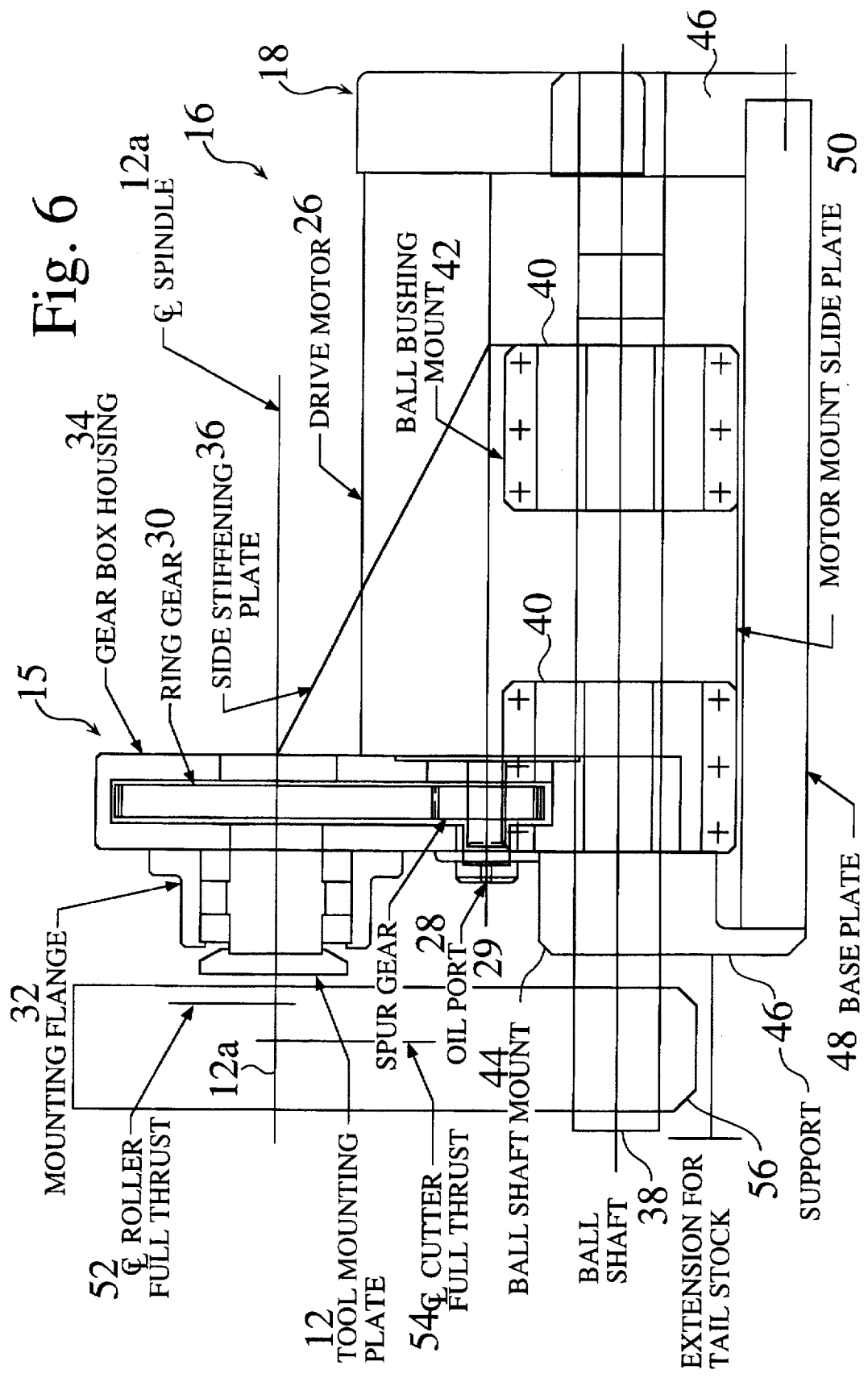

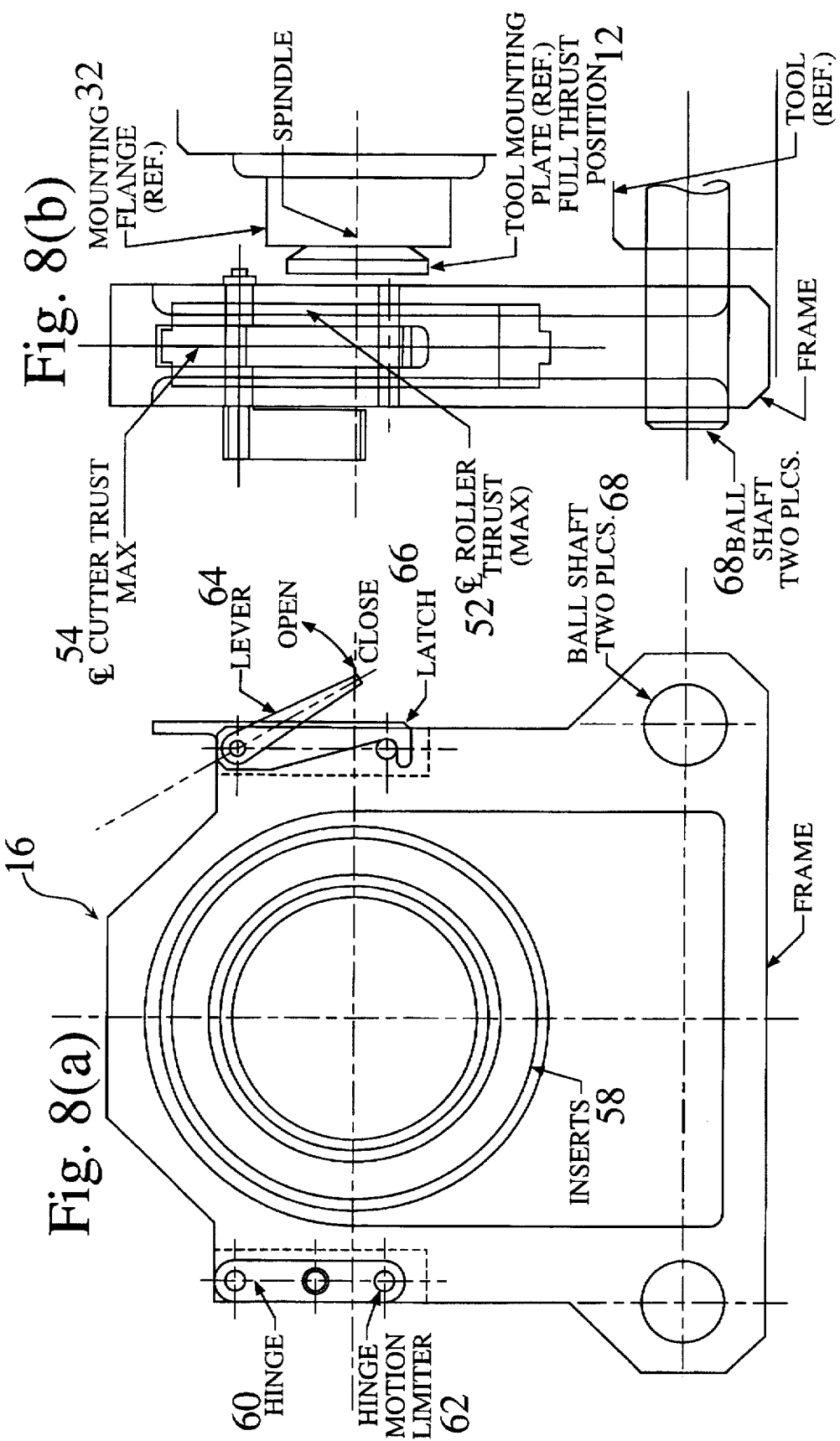

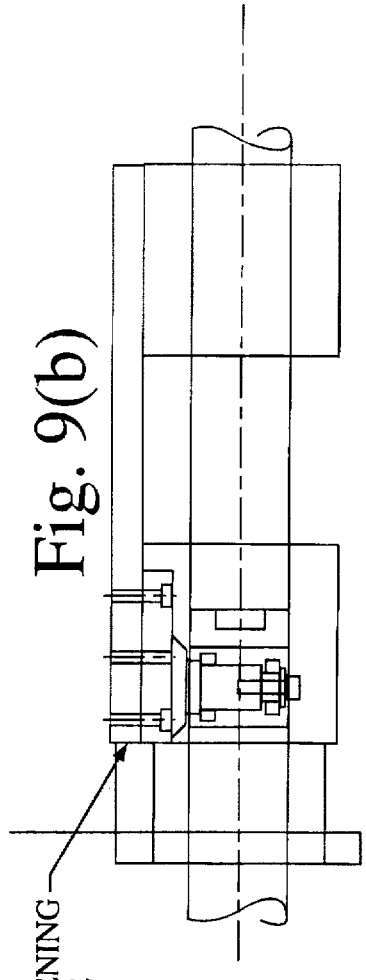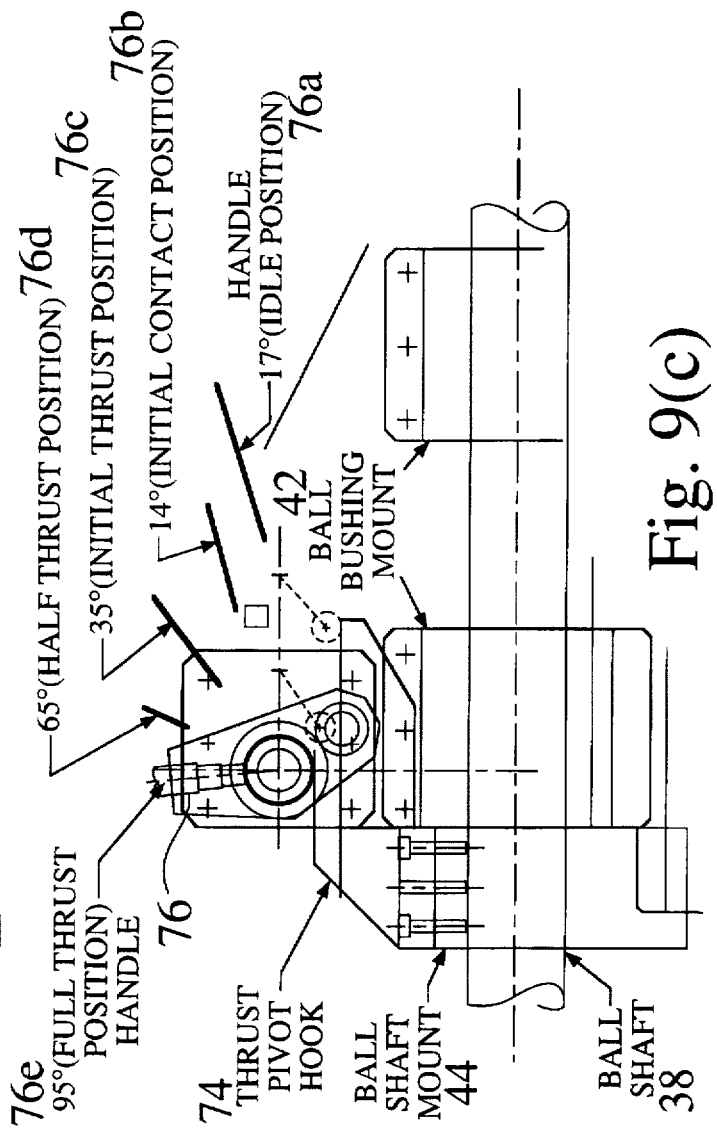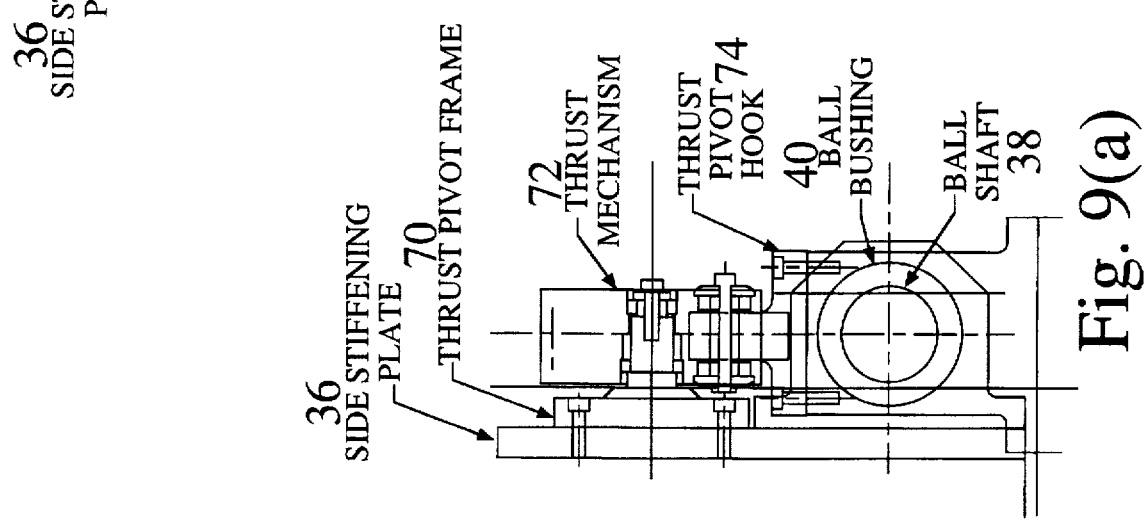

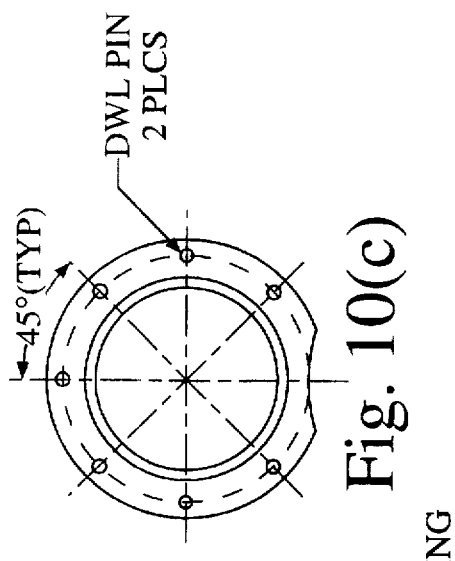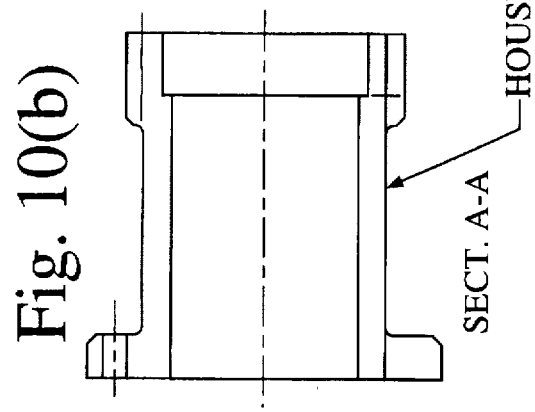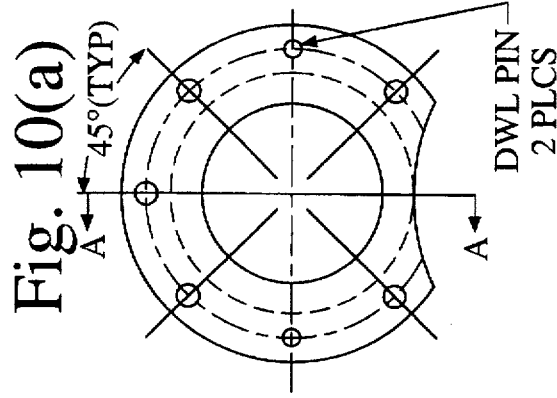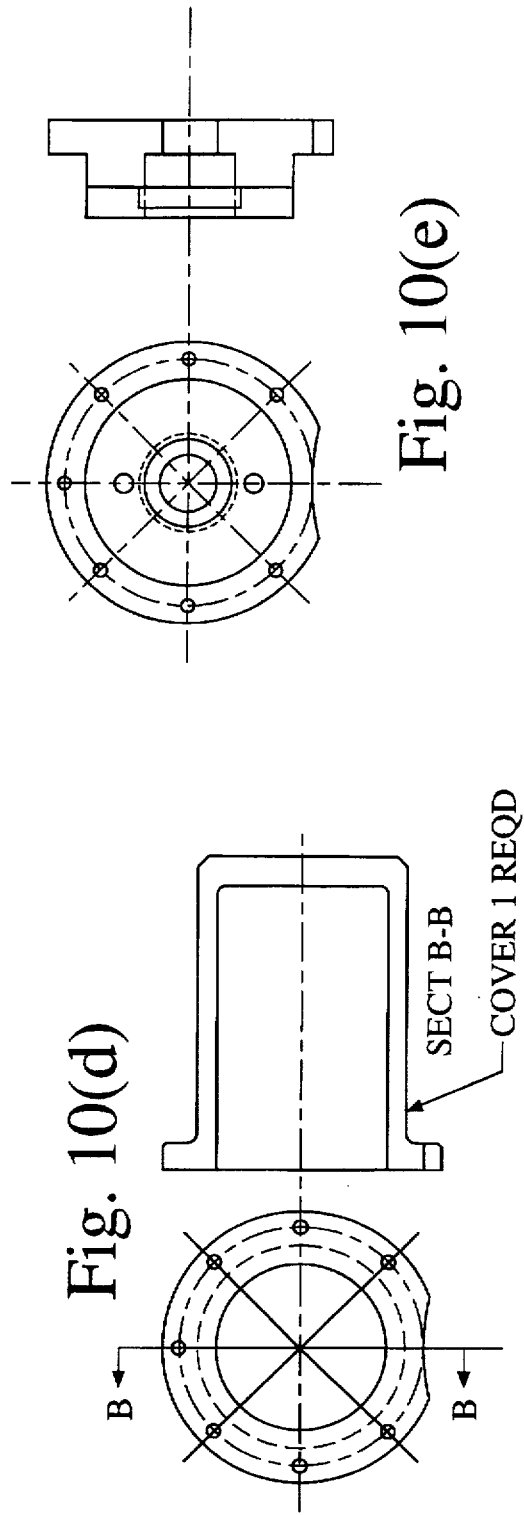

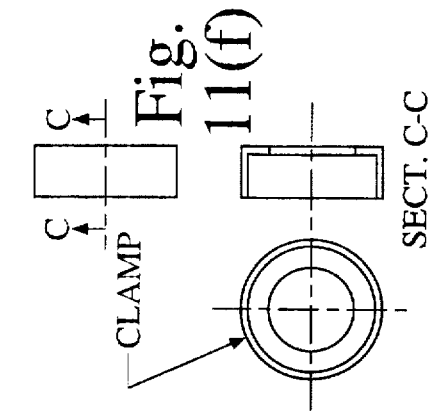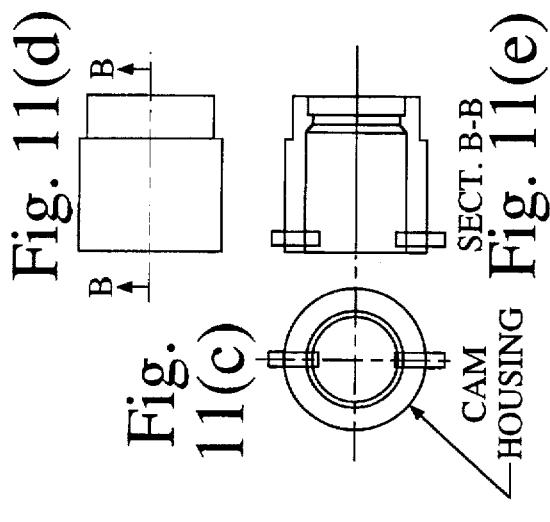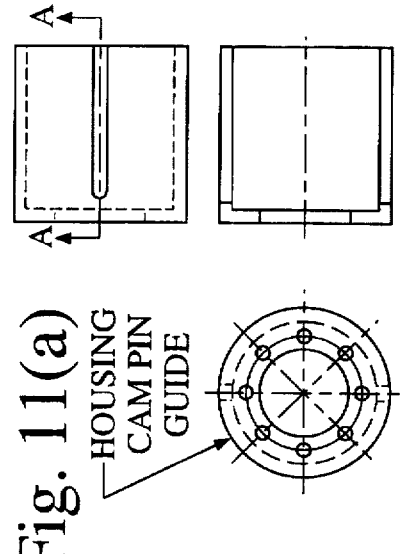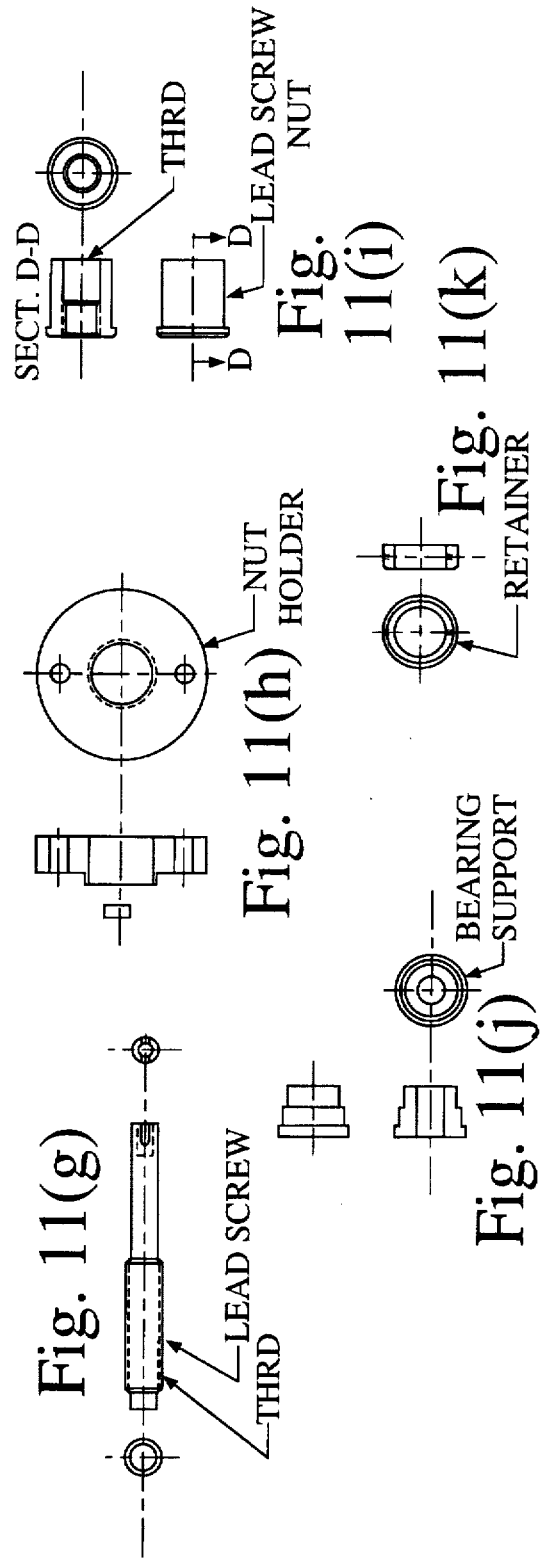

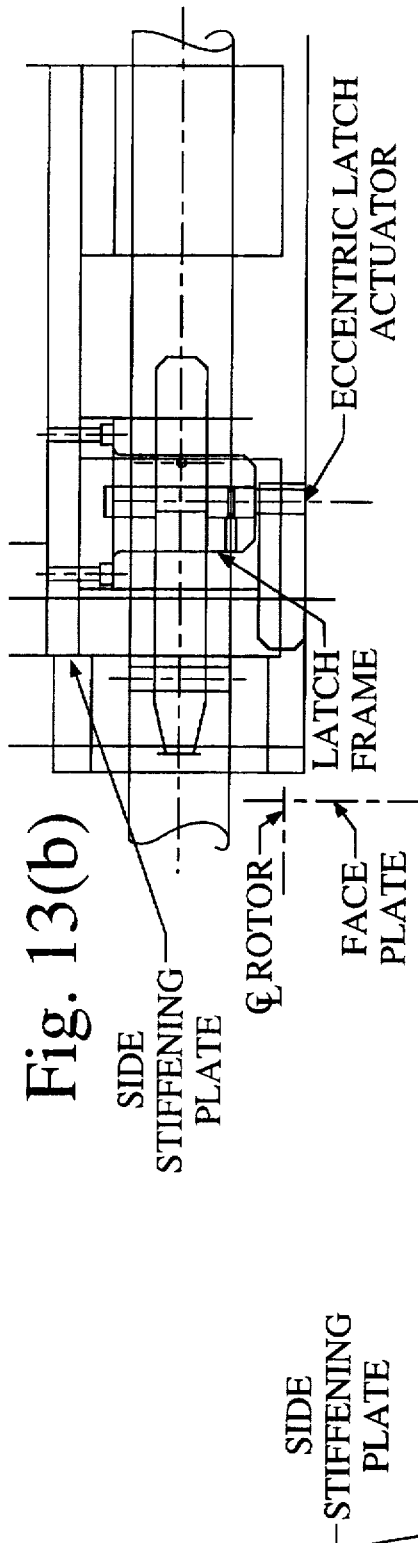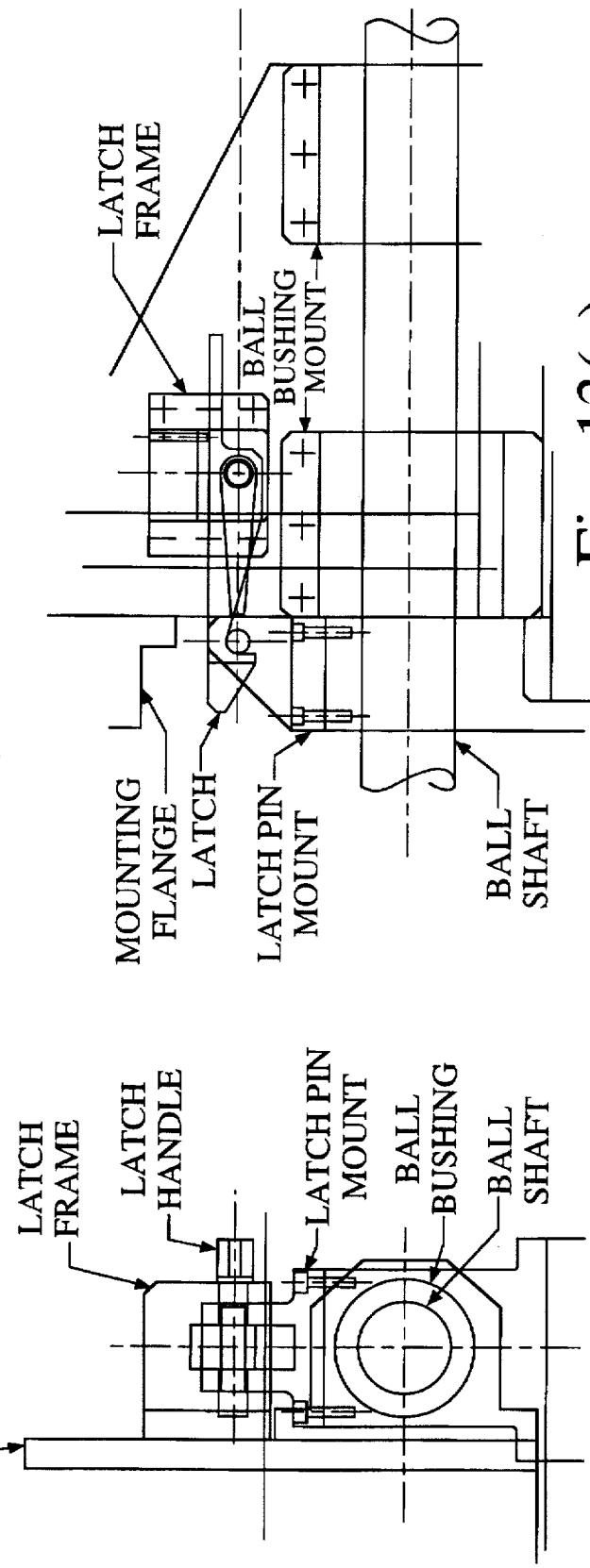
Fig. 13(b)
Fig. 13(c)
Fig. 13(a)

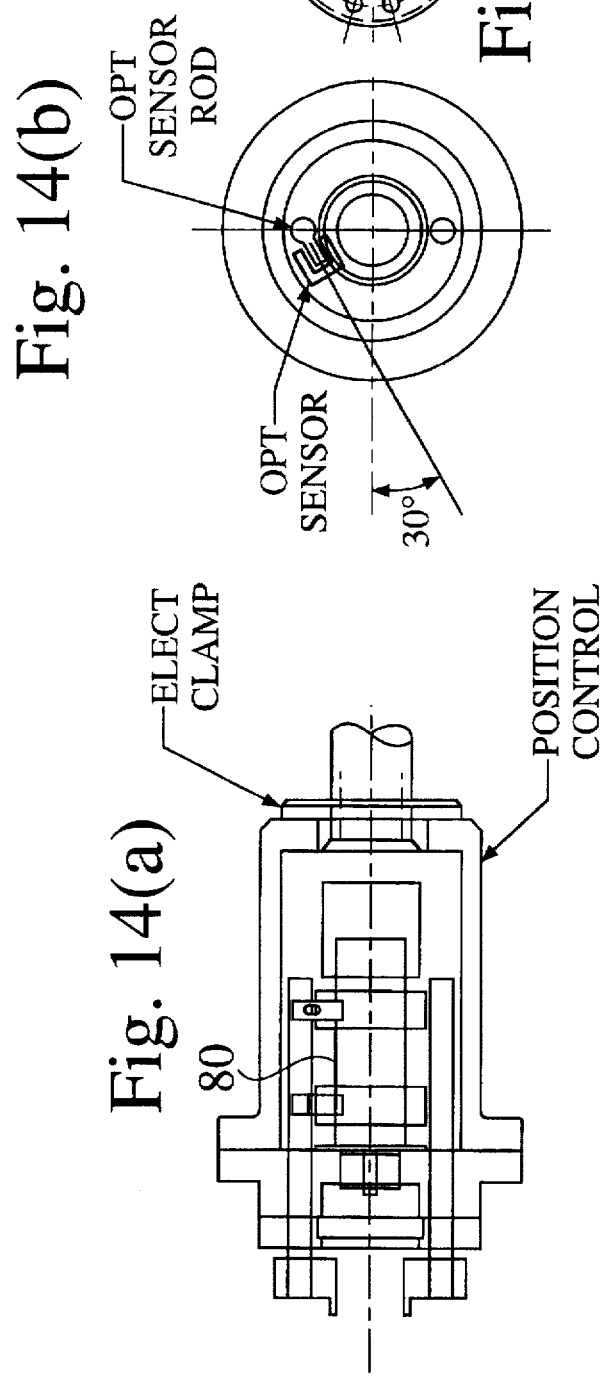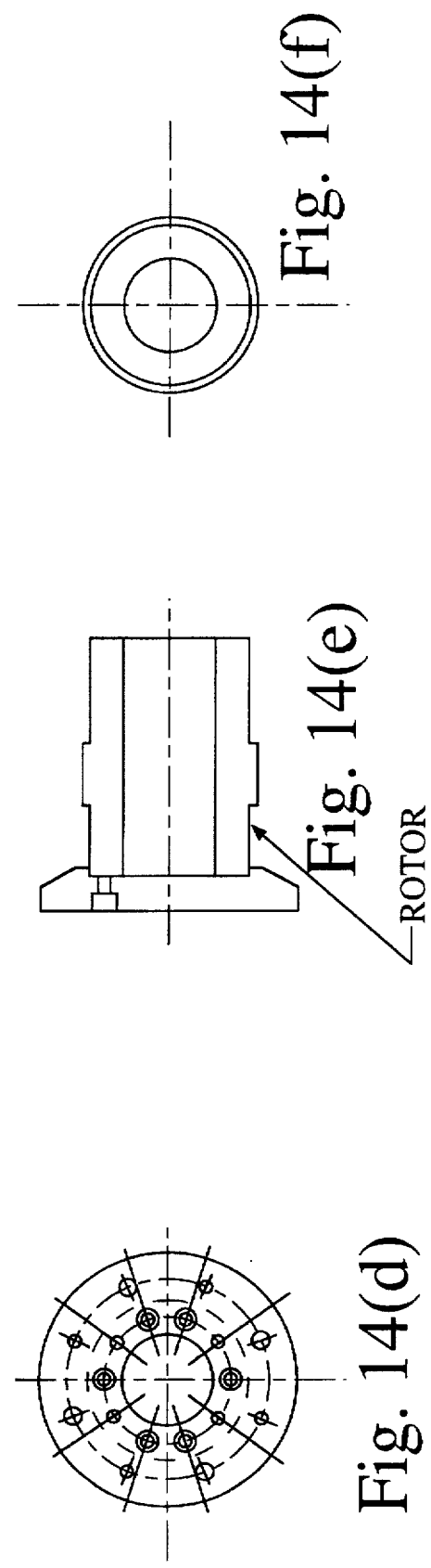

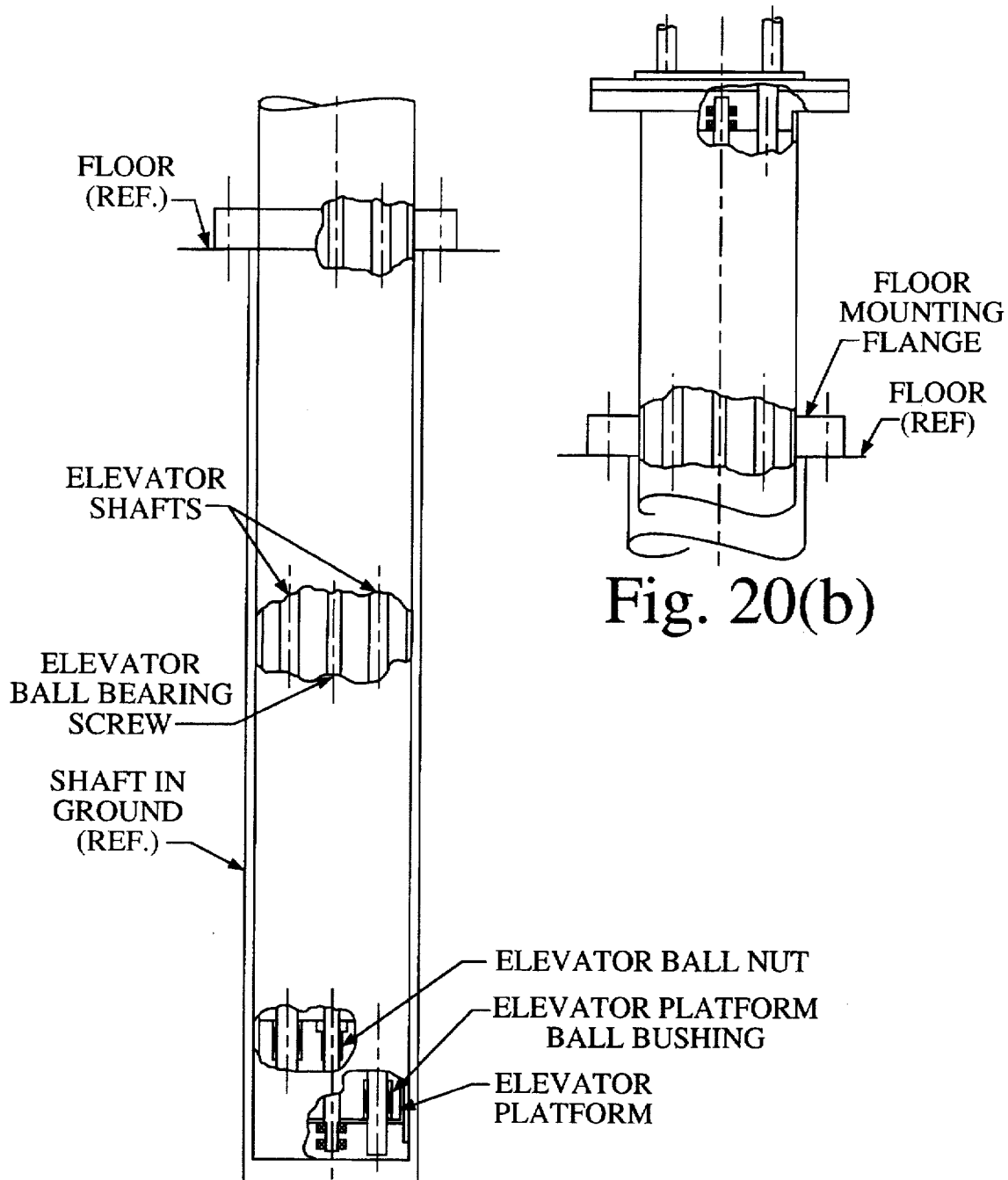

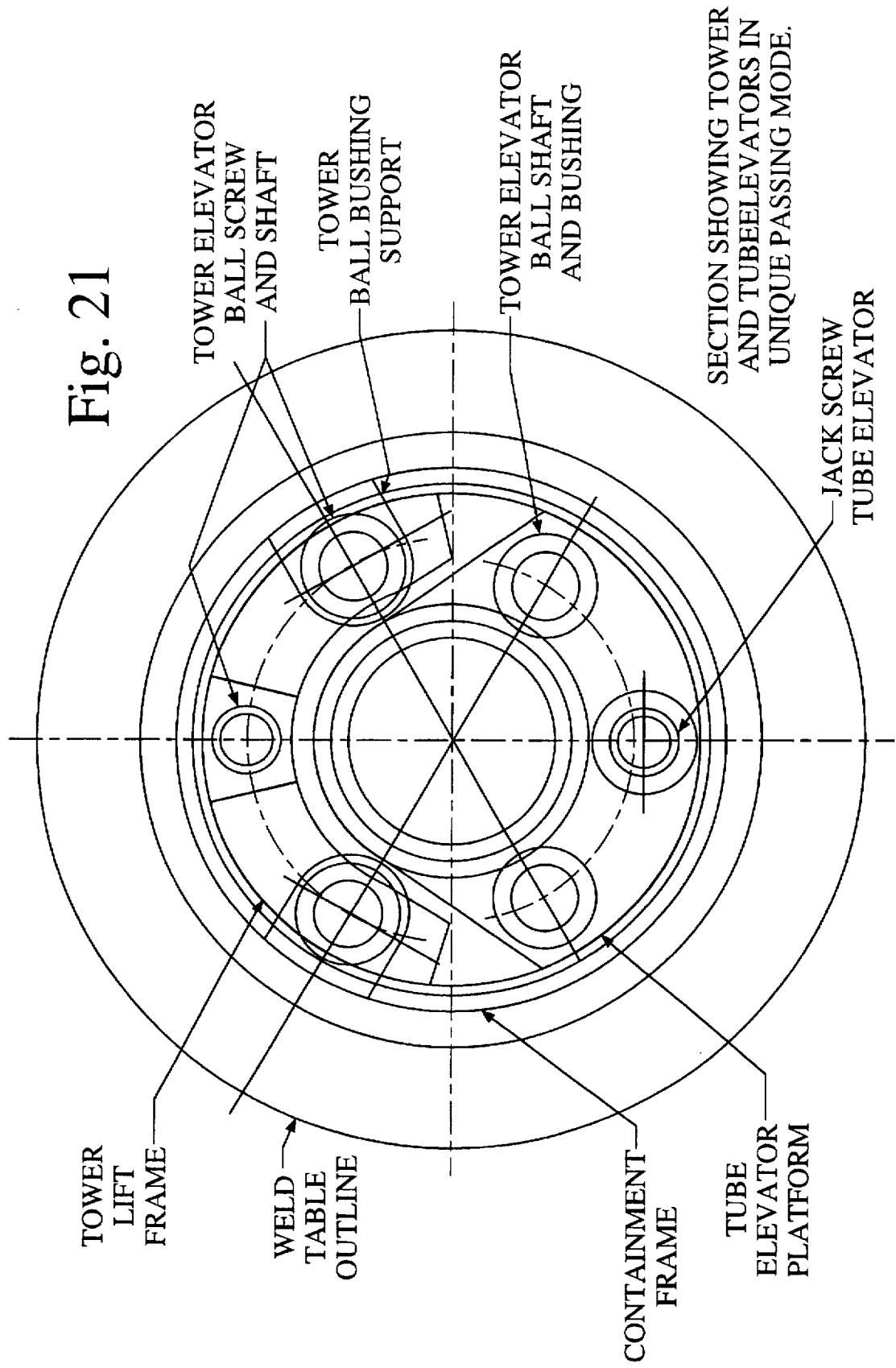

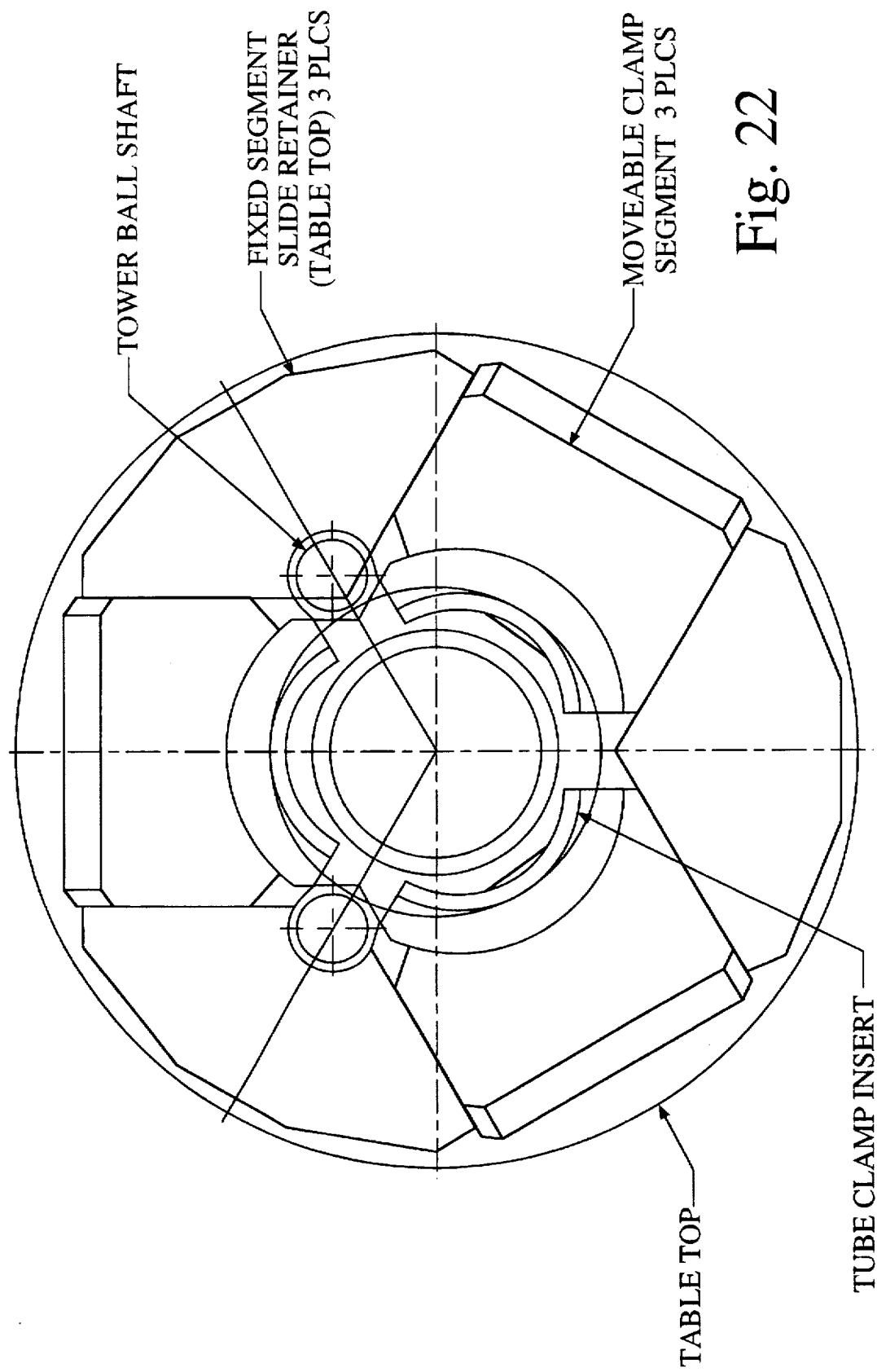

Structural Classes of Commercial Titanium Based Alloys
[Woo72][Str82]

| Alloy | Classification |
|---|---|
| Ti-5Al-2.5Sn | α |
| Ti-8Al-1Mo-1V } near-α* | |
| Ti-6Al-2Sn-4Zr-2Mo | |
| Ti-6Al-4V | |
| Ti-6Al-2Sn-6V | α + β |
| Ti-3Al-2.5V | |
| Ti-6Al-2Sn-4Zr-6Mo } near-β | |
| Ti-5Al-2Sn-2Zr-4Cr-4Mo | |
| Ti-3Al-10V-2Fe | |
| Ti-13V-11Cr-3Al | |
| Ti-15V-3Cr-3Al-3Sn | β |
| Ti-4Mo-8V-6Cr-4Zr-3Al | |
| Ti-8Mo-8V-2Fe-3Al** | |
| Ti-11.5Mo-6Zr-4.5Sn | |

\* The terms "lean-β" and "super-α" may also be used.
\*\* Obsolete alloy.

Fig. 30

HIGH-PRECISION CUTTING TOOL SYSTEM

CROSS REFERENCE TO RELATED PATENT APPLICATIONS AND CLAIMS FOR PRIORITY

The present Patent Application is a Continuation-in-Part Application based on a commonly-owned Patent entitled "High-Precision Sizing, Cutting, and Welding Tool System for Specialty Aerospace Alloys," which was assigned U.S. Ser. No. 08/090,342 filed on Jul. 9, 1993, and which was issued U.S. Pat. No. 5,531,370, Jul. 2, 1996. U.S. Pat. No. 5,531,370 itself is a Continuation-in-Part Application based on a commonly-owned pending Application entitled "High-Precision Sizing, Cutting, and Welding Tool System," which was filed on Sep. 19, 1991 and which was assigned U.S. patent application Ser. No. 07/762,713 and which is now abandoned. U.S. patent application Ser. No. 07/762,713 is itself a Continuation-in-Part Patent Application based on a commonly-owned parent Application entitled "High-Precision Sizing Tool System" which was filed on Aug. 14, 1990, which was assigned U.S. Ser. No. 07/567,951 and which is now abandoned. The Applicant hereby claims the benefit of priority of both filing dates for any and all subject matter disclosed in these two previous and the present Patent Applications.

FIELD OF THE INVENTION

The present invention includes methods and apparatus for sizing, cutting and welding a variety of metal, plastic, composite or other types of workpieces. More particularly, the High-Precision Cutting Tool System is a versatile and highly effective machine tool that is capable of severing meticulously accurate tubular sufaces. The Cutting Tool is highly adaptable to a wide variety of machine tools, mills, boring machines, lathes and CNC systems. The present invention is capable of making maching tapers, "O" ring grooves and bores in machined parts.

BACKGROUND OF THE INVENTION

The aerospace industry in the United States is rapidly being confronted with obsolete fabrication technology and equipment that cannot keep pace with the technological requirements of today's and tomorrow's aircraft requirements. Each year the machine tool industry encounters new demands of engineers who specify increasingly complex machining processes for the manufacture of metal parts. One of greatest challenges confronting designers in the precision welding industry is finding more precise and dependable techniques to join metal parts that may have exceedingly small dimensional tolerances or that may be fabricated from exotic alloys, such as titanium, Inconel™, or hybrid stainless steels. The aircraft and aerospace industries are constantly confronted by difficulties that arise when hollow cylindrical metal conduits are welded together. These tubes reside within the fuselage or wings of an aircraft and are used to convey fluids or to protect environmental control systems within the vehicle.

Although the existence of titanium was first observed in 1790, a feasible process of producing titanium was not discovered until 1938. Titanium sponge was first developed by W. J. Kroll and was produced using the magnesium reduction of titanium tetrachloride. Shortly thereafter, the United States armed services became interested in titanium because of its high melting point. The first commercial titanium became available around 1950, and the production and use of titanium alloys has increased steadily since that time.

Titanium and its alloys have material properties that make it especially desirable for special Applications, particularly within the aerospace industry. First, titanium has a high strength-to-weight ratio, which makes it comparable to many steels and stainless steels, while being only about 56 percent as heavy. While titanium alloys are about 40 percent heavier than aluminum, their greater strength allows much less material to be used for many applications. Titanium alloys also possess good corrosion resistance, and high heat performance which makes them even more desirable for aerospace applications.

Despite the desirable properties that titanium alloys possess, the high cost of the material and difficulties with production and fabrication with titanium alloys have limited their widespread use. Titanium alloys tend to be very unforgiving when standard fabrication methods are employed. They are at least as difficult to work with as hybrid stainless steel alloys. Titanium alloys are also easily contaminated at high temperatures, which can seriously impact the quality of a weld joint in a titanium structure. New techniques would be needed to prepare and weld titanium alloy structures that avoid such contamination and minimize the requirement of additional weld metal.

The basic method of mating metal tubes end-to-end is commonly referred to as "butt welding," and is well known to persons ordinarily skilled in the welding art. The tubes are usually placed in a jig or fixture, aligned, and then welded together using a conventional weldhead. If the dimensions of the two tubes are not precisely matched, conventional "spreader" fixtures, such as that shown in FIG. 1, may be used to try to correct any dimensional mismatch and minimize the differences between the dimensions of the two mating components. This spreader fixture known as a "pie-die", labeled "A" in FIG. 1, includes four sections B, C, D, and E which operate simultaneously and are arranged in a circular pattern about a central point F. All of the sections, which resemble the slices of a pie cut into quarters, move radially away from center point F. The entire device A is placed inside a hollow tube which requires shaping, and then one or more sections B, C, D, or E is forced outward against the workpiece. In FIG. 1, the primed reference numerals B', C', D', and E' indicate the displaced positions of each of the shaping sections. This technique, however, is very limited because the workpiece nearly always has a tendency to spring back to its original position after it is stretched by the "pie-die" spreader. Overcoming this elastic memory or "springback" effect is difficult to accomplish using a non-rotating sectioned spreading device. This conventional method is usually imprecise and may lead to faulty welds that can ultimately crack and break apart.

Previous mechanical devices have employed roller mechanisms to work thin gauge tin, copper, or steel sheet metal to quickly deform these common metals for simple fabricated objects, such as cans, drums, or tube sheets.

In U.S. Pat. No. 1,732,861, issued on Oct. 22, 1929, Rosenbloom discloses a simple tool that uses rollers to form flanges out of holes in sheet metal plates, such as tank or drum tops. This device was designed to be operated with a simple drill press.

In U.S. Pat. No. 4,689,863, issued on Sep. 1, 1987, Weber et al. disclose a fixture for machining the cutting line of a pipe, including a centering device insertible into an end section of the pipe.

In U.S. Pat. No. 4,402,202, issued on Sep. 6, 1983, Gombas describes a continuous rotary machine for roll flanging the ends of cylindrical container bodies.

In U.S. Pat. No. 1,543,583, issued on Jun. 23, 1925, Mason discloses a tool that uses a roller mechanism to bell tubes in boilers during the manufacturing process.

In U.S. Pat. No. 2,388,643, issued on Nov. 6, 1945, Rode et al. used an apparatus employing swaging dies to taper or swage the outer surface of common seamless tubing.

In U.S. Pat. No. 3,811,306, issued on May 21, 1974, Yoshimura discloses a method and apparatus for forming and deburring a cylindrical can fabricated from aluminum or tin plate, which employed rollers to the outside surface of the workpiece.

In U.S. Pat. No. 3,498,245, issued on Mar. 3, 1970, Hansson discloses a roller sizing tool for forming can bodies by working the relatively brittle sheet metal beyond its elastic limit. The Hansson reference discloses rollers (53) that protrude from shanks (54) which pass through bores (56) in a body (46) which contains a complex ball bearing retainer (60, 61, 62, 63 and 64) for each roller (53). A reduced threaded end portion (55) extends from each shank (54) past a washer (58), and is fastened on the opposite side of the body (46) with a nut (57). The rollers (53) are "journalled in the disk-like body 46". (See Hansson, Col. 7, Line 35.) In Hansson's arrangement, the rollers (53), shanks (54) and nuts (57) spin together on an inner ball bearing race (61). Because of the action of the internal ball bearing (60), Hansson's rollers (54) may shift their positions relative to an axis that extends perpendicular to the body (46) when they encounter mechanical resistance presented by the workpiece. This slippage is perfectly acceptable for the process of manufacturing ordinary metal cans, but Hansson's machine is not capable of performing the precise sizing of specialty aerospace alloys which possess high strength-to-weight ratios, good performance at elevated temperatures, and high corrosion resistance.

Hansson's invention was purposely developed for spin flanging of can body edges. (See Hansson, Col. 1, Lines 2-3.) This operation is rough and crude compared to the precise tolerances involved in the processing of specialty alloys in for the aerospace industry. Hansson clearly states that the object of his invention is to increase the transverse ductility of the edges of a high-strength brittle metal can. (See Hansson, Col. 1, Lines 16-17.) Hansson, however, relied on the malleability of his materials which do not experience hardening as they are formed. He was primarily concerned with reducing the stability of his workpiece. The Hansson reference does not provide for easy repair or replacement of the rollers (14).

While past inventors provided mechanisms for the simple, non-critical fabrication of thin gauge common metals, they designed their devices with the intent to utilize the moderate ductility and malleability of the metals they were working with at that time. They never had to consider the difficulties of dealing with the high ductility that is exhibited by many modern high-strength aerospace alloys that are being prepared for precision welding techniques. Aerospace applications often require the precise weldments of titanium tubing of many diameters and gauge sizes, such as 1" diameter tube with a 0.020" wall thickness, or a 6" diameter with a wall thickness of 0.030" to 0.040".

The problem of providing a high-precision sizing, cutting, and welding tool for use with metals, plastics, composites and other materials has presented a major challenge to engineers and technicians in the materials industry. The development of an accurate and versatile system that overcomes the difficulties encountered when conventional cutting would constitute a major technological advance in the metal fabrication business. The enhanced performance that could be achieved using such an innovative device would satisfy a long felt need within the industry and would enable machine tool equipment manufacturers and users to save substantial expenditures of time and money.

SUMMARY OF THE INVENTION

The High-Precision Cutting Tool System disclosed and claimed in this Patent Application solves the problems encountered by conventional machine tool devices. The Cutting Tool is capable of precisely and permanently severing tubular metal, plastics, composites and other materials.

The Sizing Tool

The sizing or flaring tool includes a set of revolving rollers supported by bearings and a mounting plate. Although the preferred embodiment of the roller has a tapered work surface, any number of useful configurations may be employed. The roller is capable of engaging either the inside or outside surface of a hollow titanium, Inconel™, or hybrid stainless steel tube. The rollers exert force on the end of a workpiece having a circular cross-section in a configuration that resembles a polygon inscribed in a circle. As the rollers are moved toward the workpiece, the workpiece is gradually deformed as it moves farther into the inclined surface presented by each roller. Each time the rollers make one revolution while in contact with the workpiece, each roller bends every spot on the end of the tube radially outward and then radially inward. The total deflection or deformation of the tube exceeds the elastic modulus of the workpiece so that "springback" is prevented. The dynamic flexure flaring method provided by the present invention enables a technician to produce precisely formed surfaces within a tolerance of one-thousandth of an inch which can be relied upon to maintain their shape over long periods of time. While the preferred embodiment utilizes eight rollers, any number of rollers may be utilized with varied configurations to match the needs presented by a particular workpiece. While the typical workpiece is a hollow metal tube, any number of structural shapes, including those having elliptical and oval cross-sections, may be sized using the present invention. The workpiece can be composed of any titanium, Inconel™, or hybrid stainless steel material which is susceptible to deformation under a gradual and repeated alternating radial force. In an alternative configuration, the workpiece rotates and the Sizing Tool remains stationary.

The Cutting Tool

The Cutting Tool is controlled by an innovative tool advance assembly that converts translational motion to precise radial motion which governs the action of the cutting bit as it progresses into the work piece and severs a tubular metal, plastic, composite or other type of workpiece. A shaft bearing a revolving cam roller is received by a slot in a tool bit holder that is constrained to move up and down in a radial direction. When the cam roller moves in its circular pathway, the tool bit holder is constrained to move perpendicular to the longitudinal axis of the cam shaft and engages the workpiece that surrounds it. The rotational motion of the cam shaft is, in turn, controlled by the twisting of spiral guidance channels formed in a cup which resides at the opposite end of the cam shaft. These spiral channels are designed to receive a cam pin, which is held in place by a cam housing that surrounds the cam shaft. A second separate guide cup surrounds both the cam housing and the cam shaft located inside the cam housing. When the cam housing moves forward toward the workpiece, the upper portion of the cam pin which it bears is constrained to move only in a straight line parallel to the long axis of the cam shaft by slots formed along the separate guide cup which surrounds the cam housing. The lower portion of the same cam pin extends through the cam housing and engages a spiral channel on the cam shaft. When the cam pin moves, the spiral channels cause the cam shaft to rotate, which forces the cam roller to move in a circular path. The circular motion of the cam roller moves the tool bit up and down along a radial direction.

The Cutting Tool is not only capable of cutting a tubular workpiece from the inside out, but can also be configured to cut a tube from the outside. The Cutting Tool is highly adaptable to a wide variety of machine tools, mills, boring machines, lathes and CNC systems. The present invention is capable of making maching tapers, "O" ring grooves and bores in machined parts in metals, plastics, composites and other materials.

The Welding Tool

The present invention is a high performance Cutting Tool System that addresses the troublesome fabrication difficulties posed by conventional metalworking and welding methods. These innovative methods and apparatus provide an effective and efficient means that will enable manufacturers of aviation equipment to create high quality products that will enhance the safety and reliability of a wide variety of aircraft tubular components fabricated from titanium, Inconel™, or hybrid stainless steel.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

FIG. 1 is a front schematic view of a conventional non-rotating radial spreading device.

FIGS. 2D through 2K are side views of rollers that exhibit illustrative examples of the various work surfaces that may be utilized with the present invention.

FIG. 2L is a schematic diagram of one moving roller impinging upon a workpiece. As the roller rotates in a clockwise direction, all the points along the inner circumference of the hollow cylinder experience repeated alternating forward (+) and reverse (−) bending.

FIG. 2M presents a side view of a sized cylinder that delineates the locations of maximum and minimum deflection due to the dynamic flexure action of the rollers.

Figure 4:
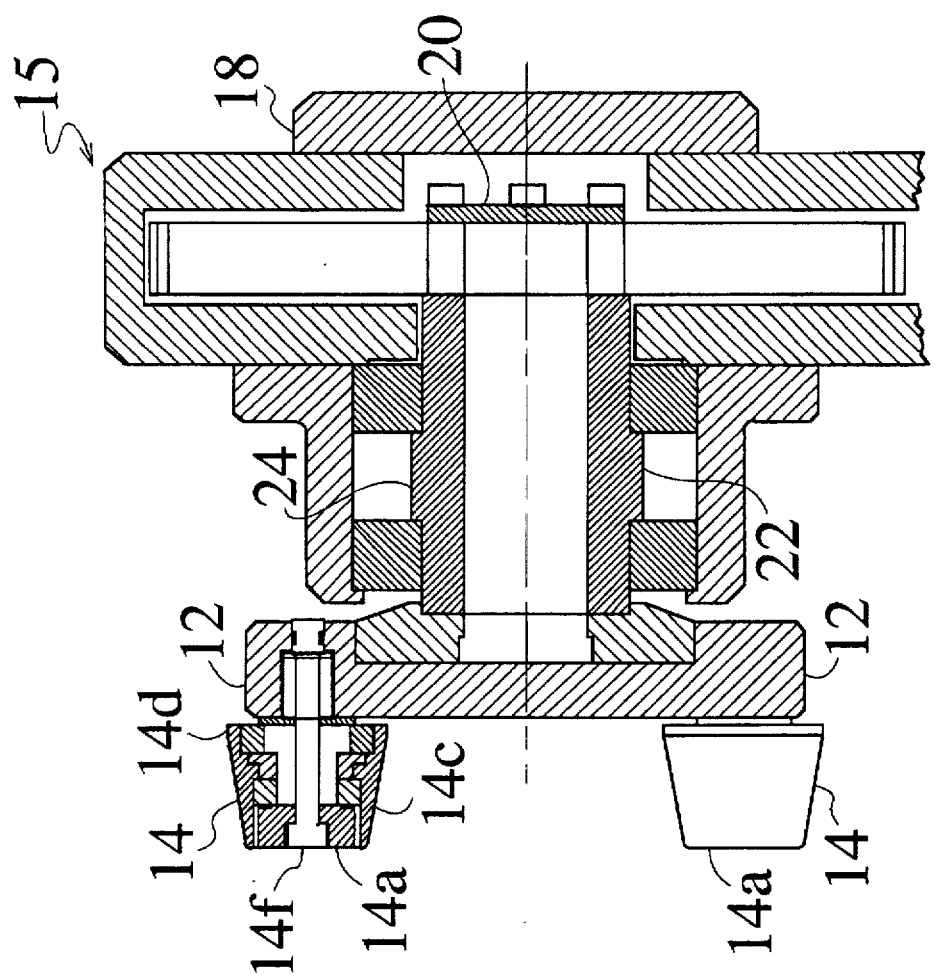
Figure 3:
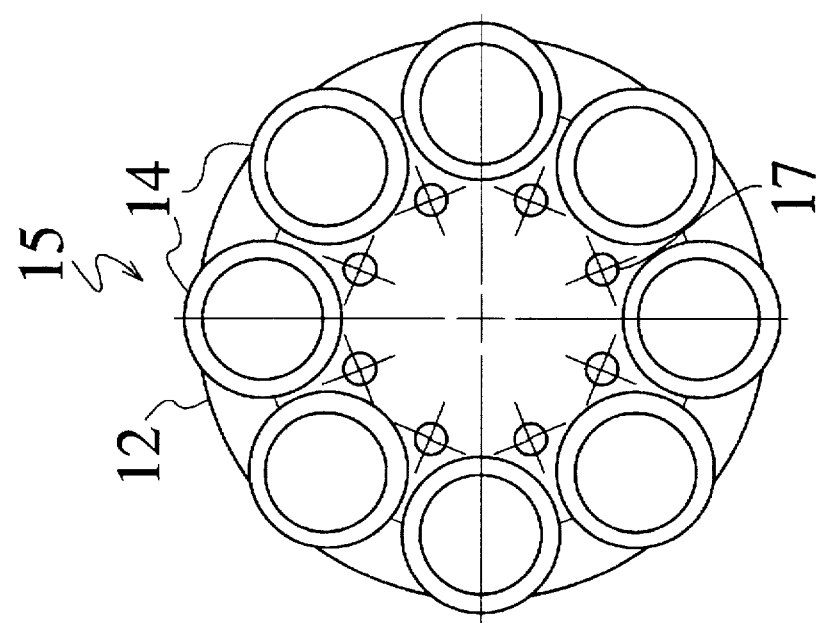

FIGS. 3 and 4 reveal both a partial, side, cross-sectional view of a tool mount assembly coupled to the roller plate and a corresponding front view of eight rollers mounted on a roller plate.

FIGS. 5a, 5b, 5c, and 5d exhibit detailed views of the rollers and roller plate.

FIG. 6 is a cross-sectional view of the tool mount assembly installed on a motor assembly.

Figure 7:
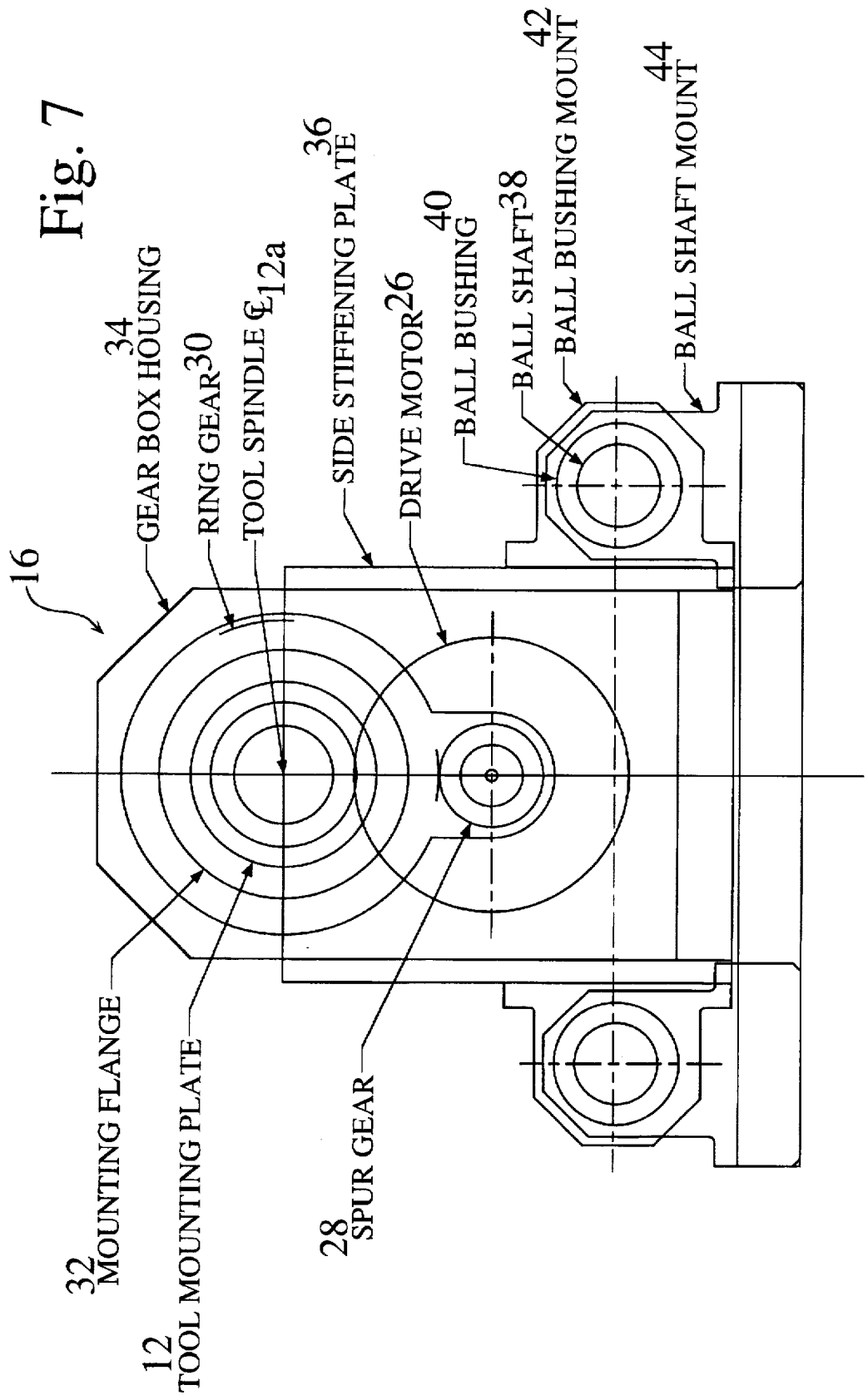

FIG. 7 is a front cross-sectional view of the assembly shown in FIG. 6.

FIGS. 8a and 8b provide front and side views of a workpiece frame.

FIGS. 9a, 9b, and 9c include several views of a Cutting Tool advance mechanism.

FIGS. 10a, 10b, 10c, 10d, and 10e reveal various sectional views of the Cutting Tool housing.

FIGS. 11a, 11b, 11c, 11d, 11e, 11f, 11g, 11h, 11i, 11j, and 11k depict views of components within the Cutting Tool including a housing cam pin guide, a cam housing, a clamp, a lead screw, a nut holder, a lead screw nut, a bearing support, and a retainer.

Figure 12:
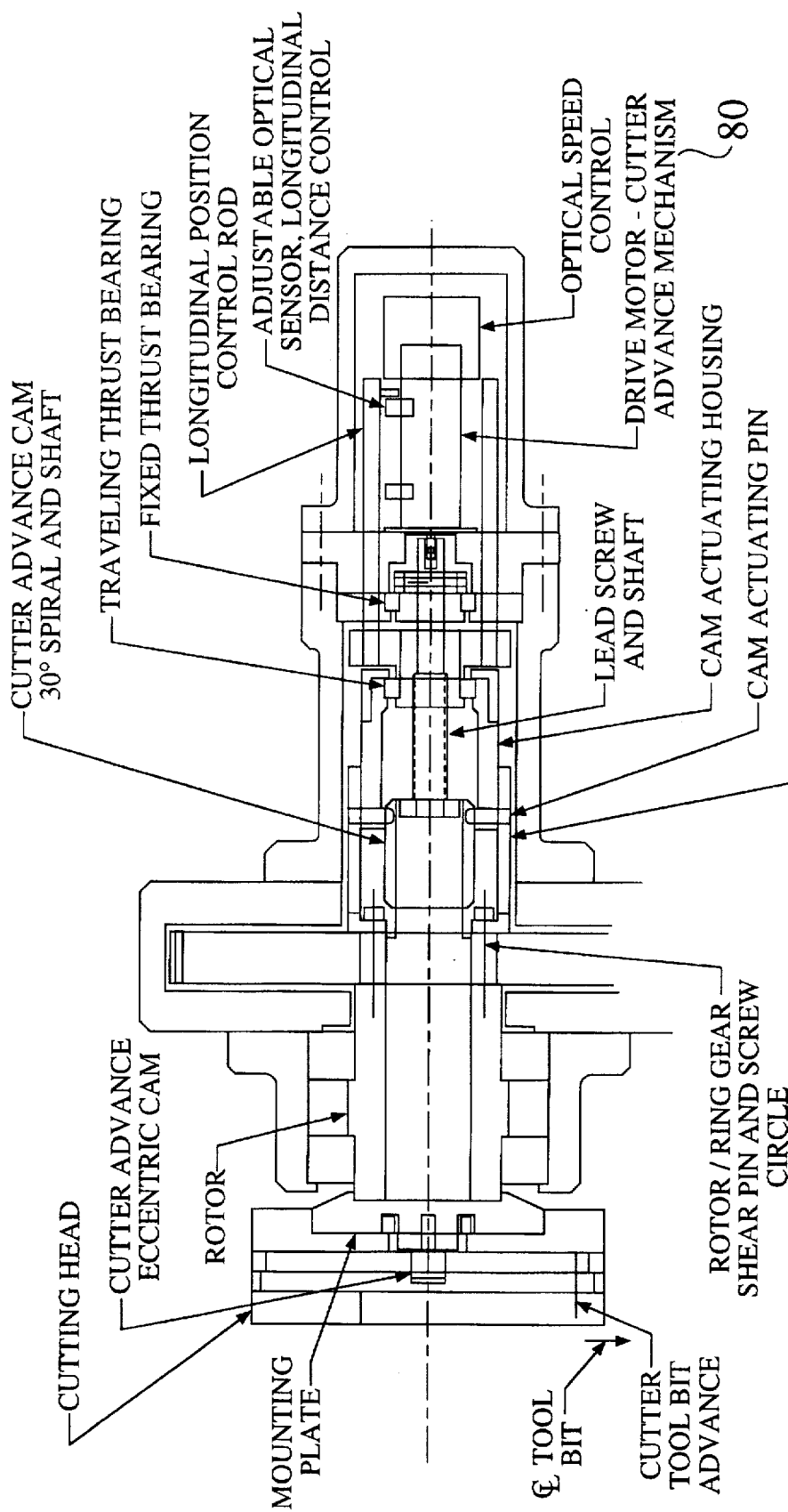

FIG. 12 is a cross-sectional view of a Tool Bit Advance Subassembly.

FIGS. 13a, 13b, and 13c provide various views of a cutter tool latch mechanism, showing a ball shaft, a ball bushing mount, a ball bushing, a latch, a latch frame, a latch handle, and an eccentric latch actuator.

FIG. 14 exhibits a series of views of an optical sensor and electrical clamp rotor. FIG. 14a shows a position control component. FIG. 14b depicts an optical sensor. FIGS. 14c, 14d, 14e, and 14f portray various views of a rotor assembly within the position control component.

Figure 15:
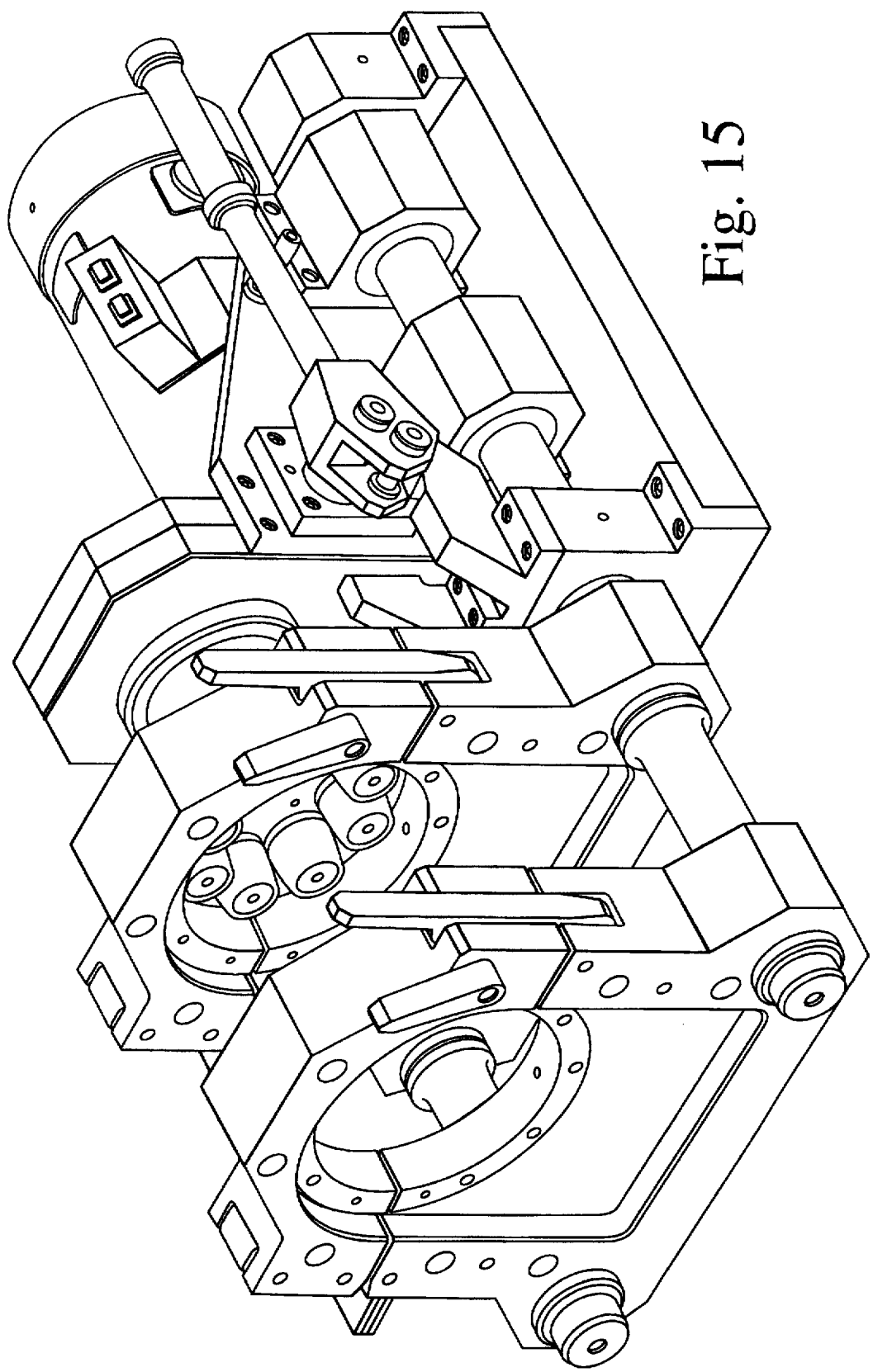

FIG. 15 is a perspective view of the preferred embodiment of the entire Sizing Tool and its associated drive system.

Figure 16:
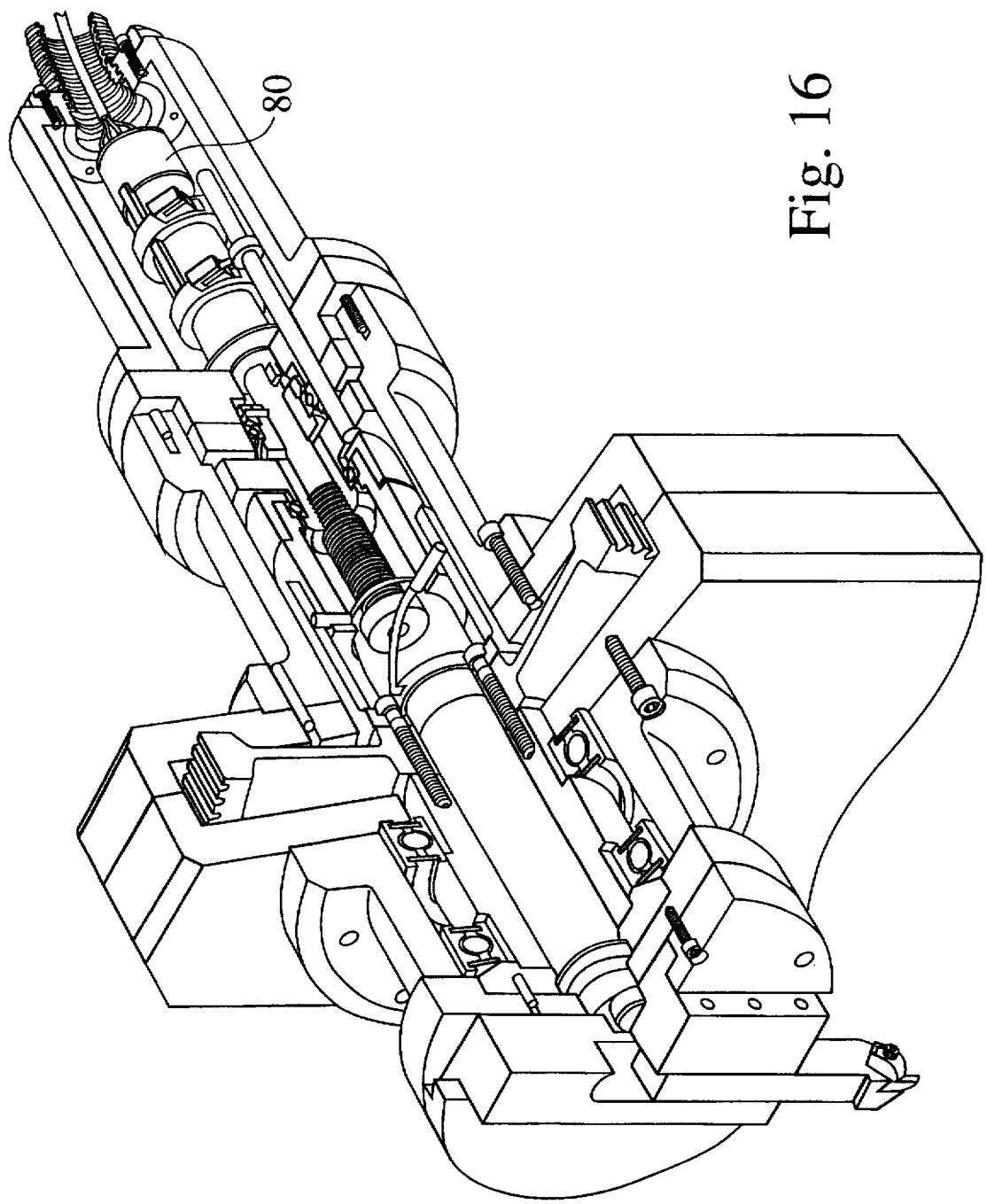

FIG. 16 is a cut-away perspective view of the preferred embodiment of the entire Cutting Tool and its associated drive system.

Figure 17:
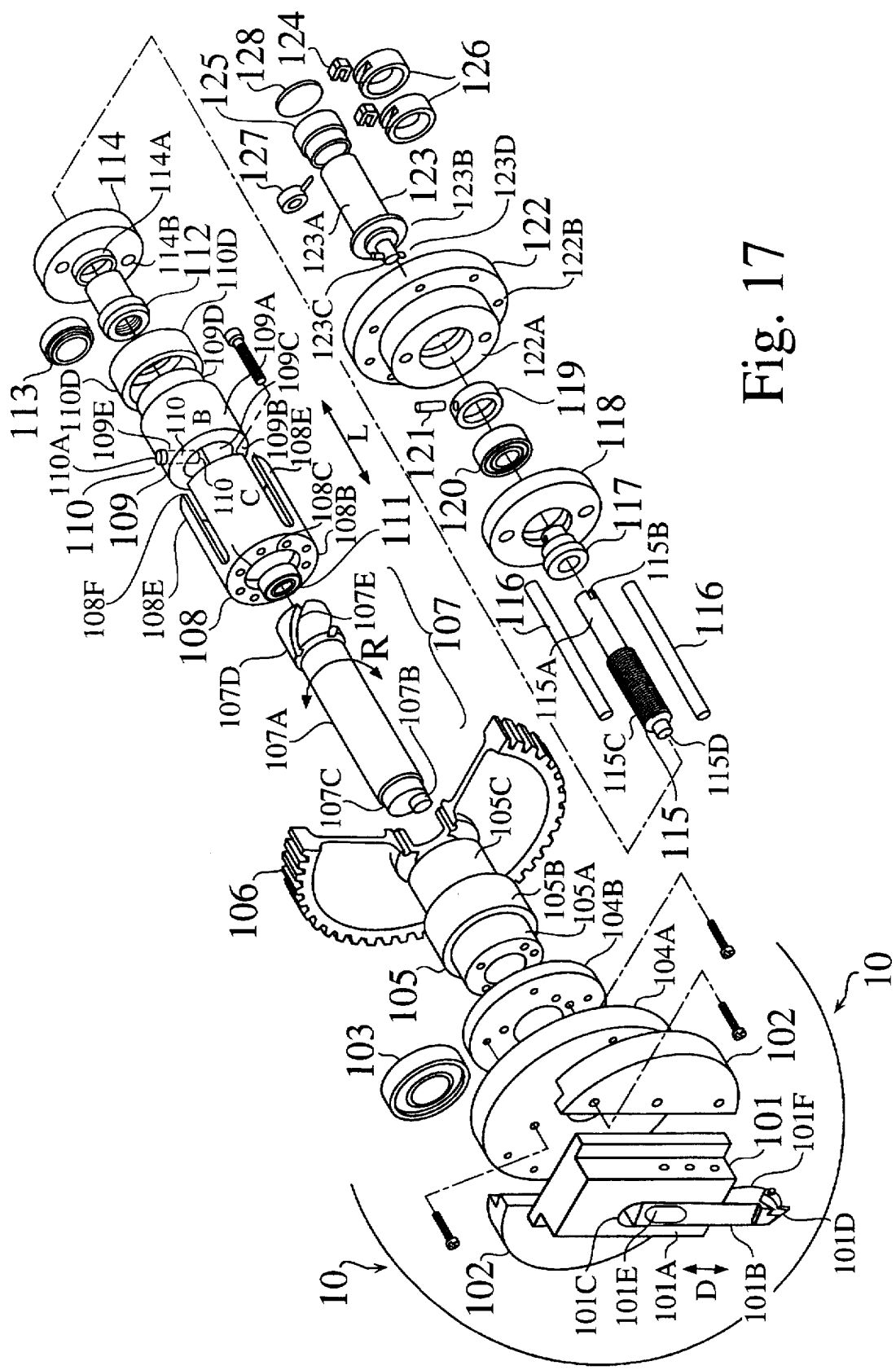

FIG. 17 is an exploded view of the interior components of the preferred embodiment of the Cutting Tool.

Figure 18:
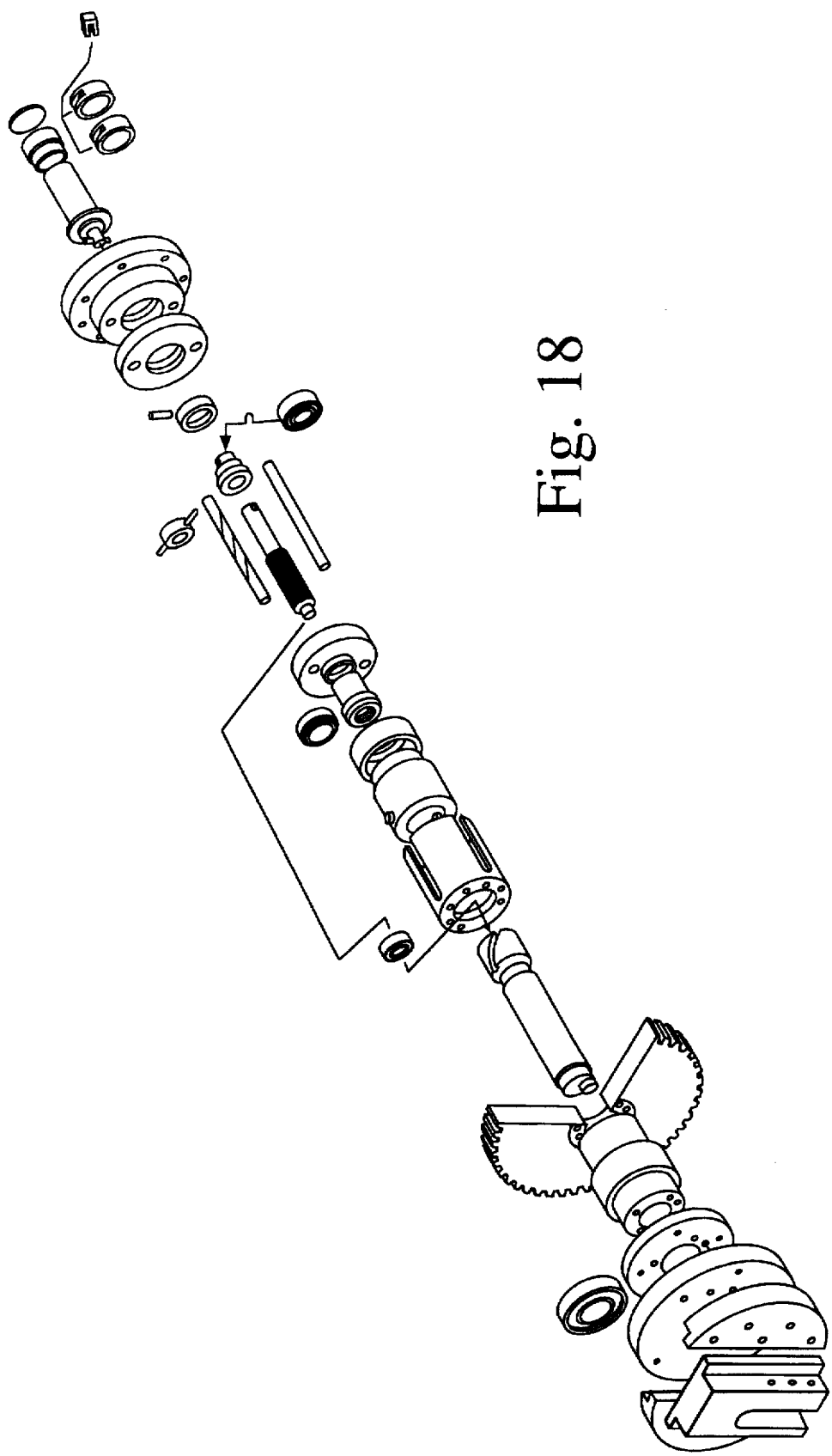

FIG. 18 is a second exploded view of the interior components of the preferred embodiment of the Cutting Tool.

Figure 19:
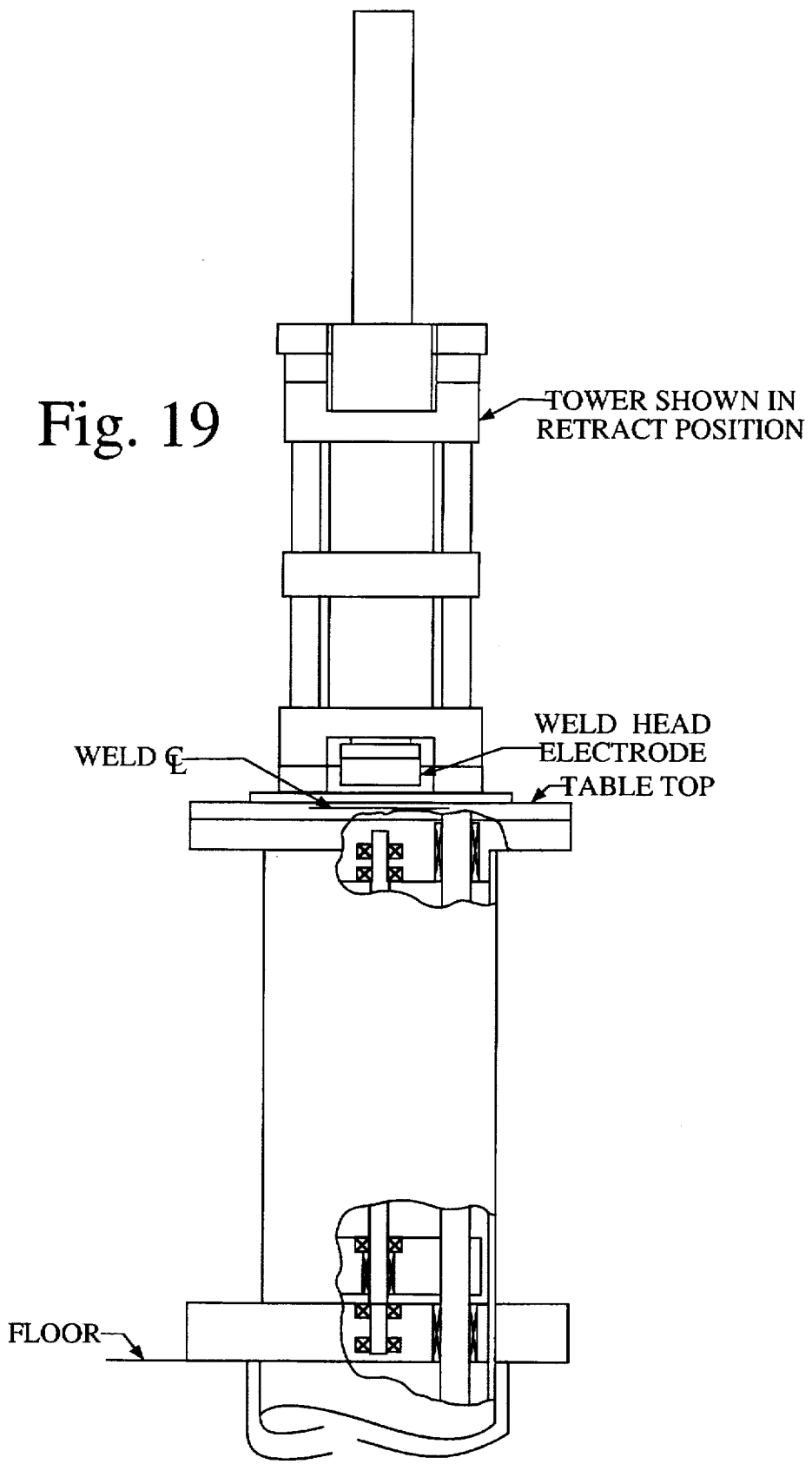
Figure 20C:
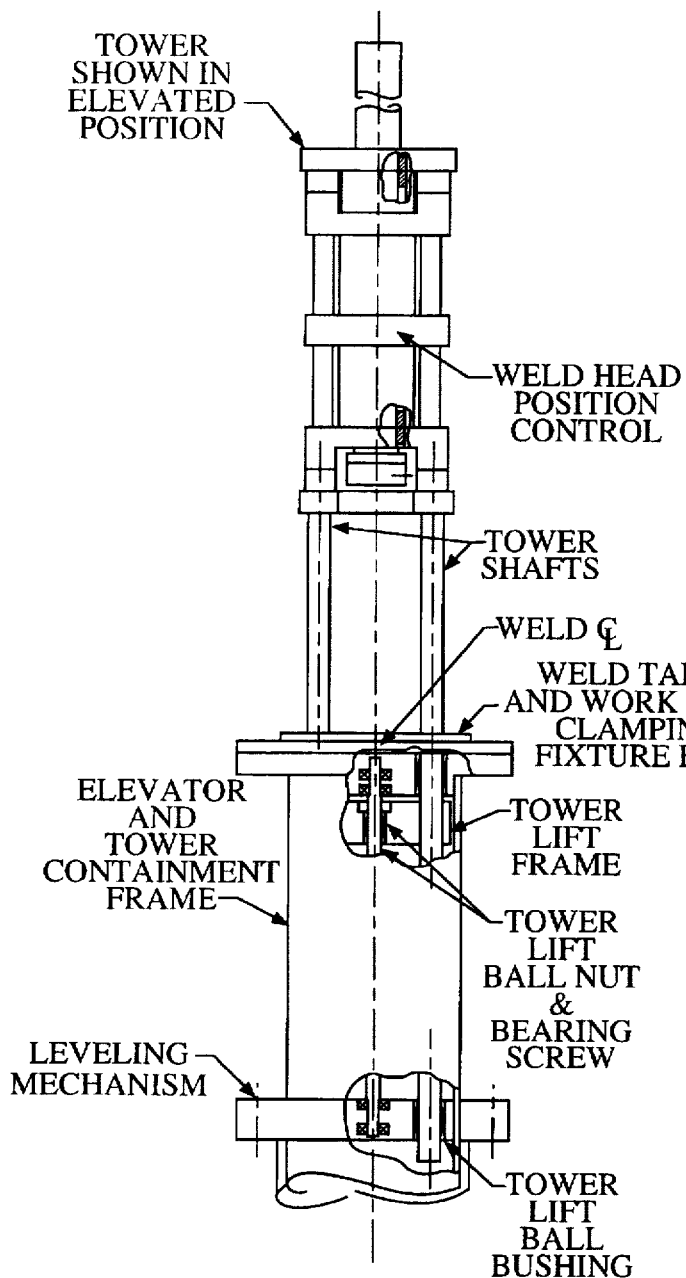
Figure 20D:
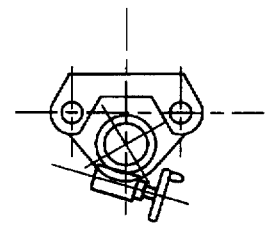
Figure 20E:
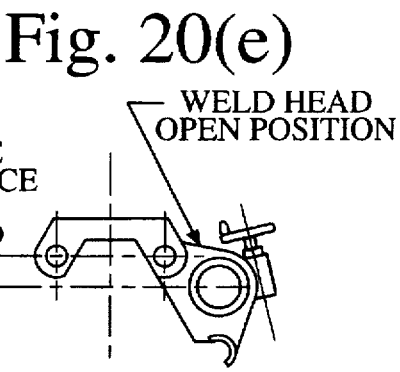
Figure 20F:
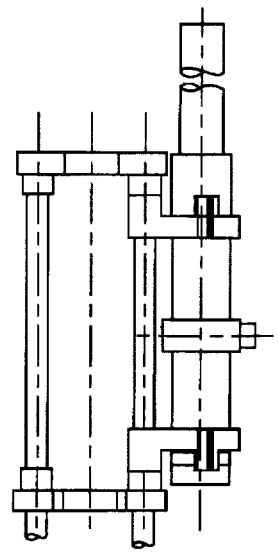

FIG. 19 is a schematic view of one of the preferred embodiments of the Welding Tool.

FIGS. 20a, 20b, 20c, 20d, 20e and 20f provide various depictions of the Welding Tool tower, which include elevator shafts, a floor mounting flange, a weld table, and the weld head in different positions.

FIG. 21 exhibits a section of the Welding Tool which is located just below the weld table top.

FIG. 22 is a plan view of the weld ruble top.

Figure 23:
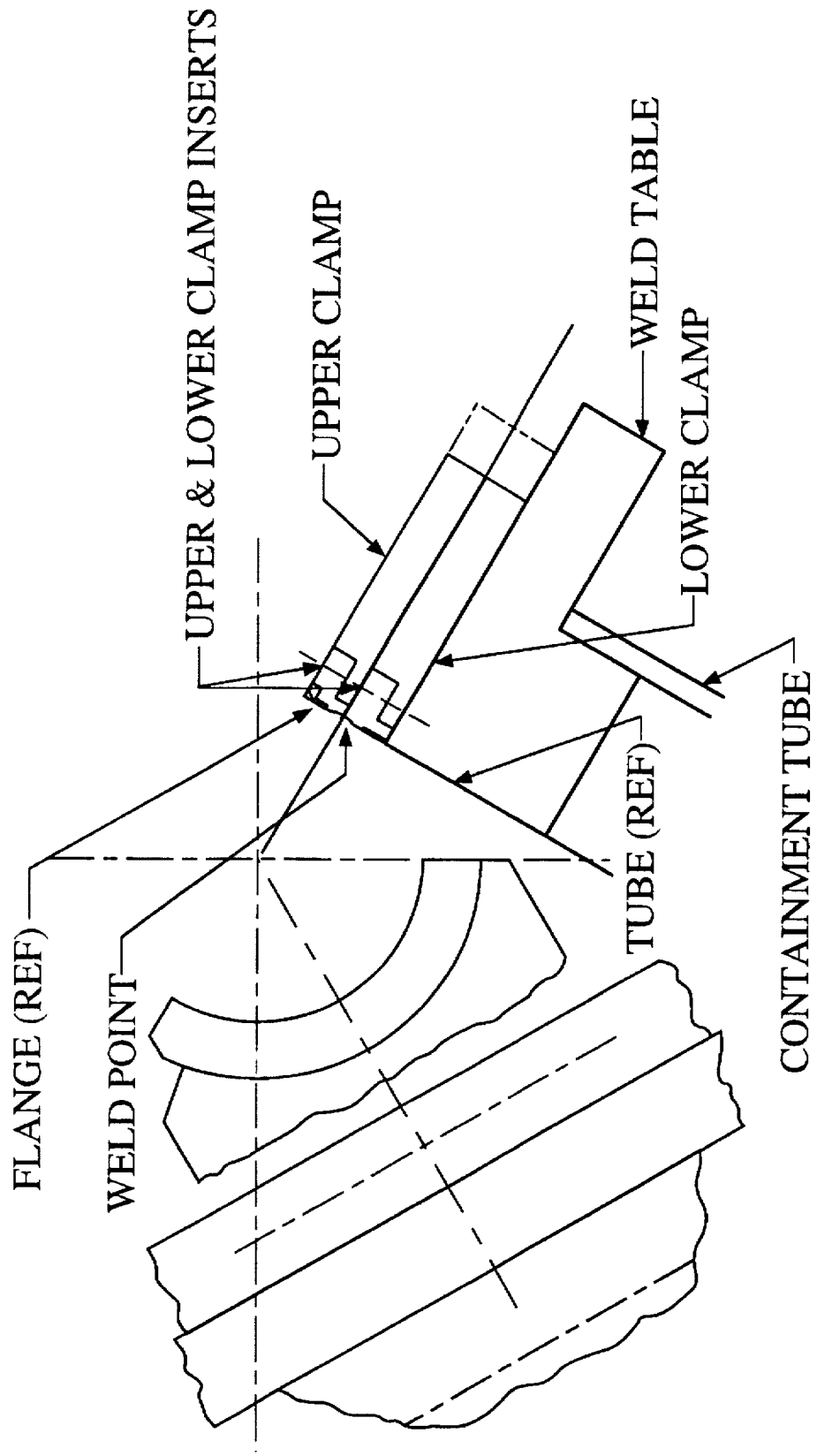

FIG. 23 shows the clamp mechanism of the Welding Tool in cross-section.

Figure 24:
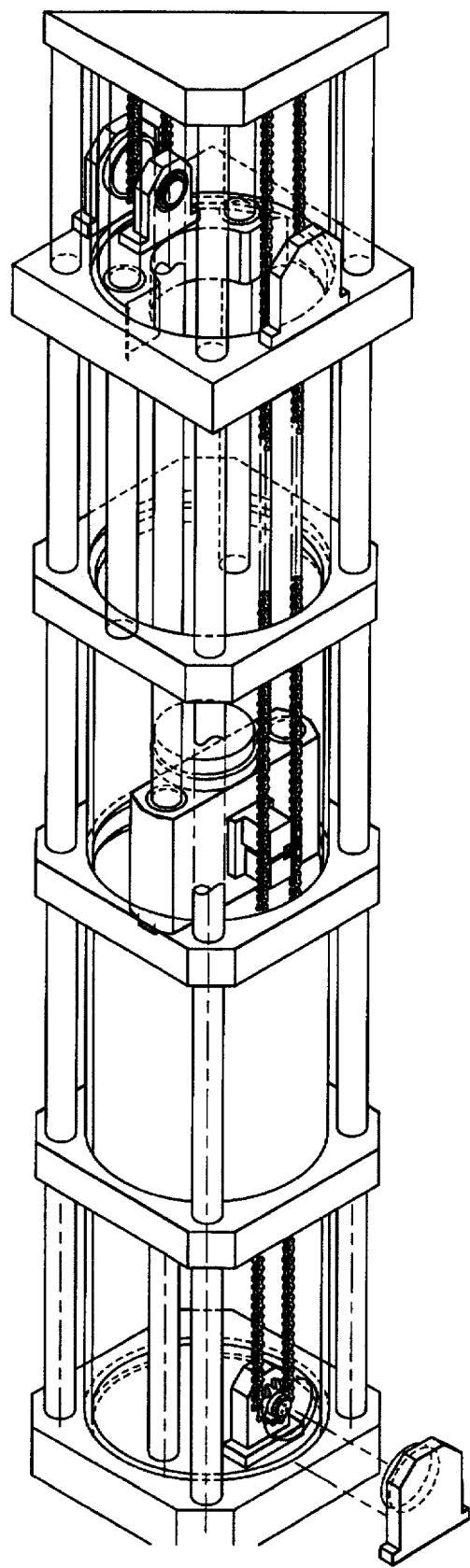

FIG. 24 is a schematic drawing of the entire Welding Tool tower.

Figure 25:
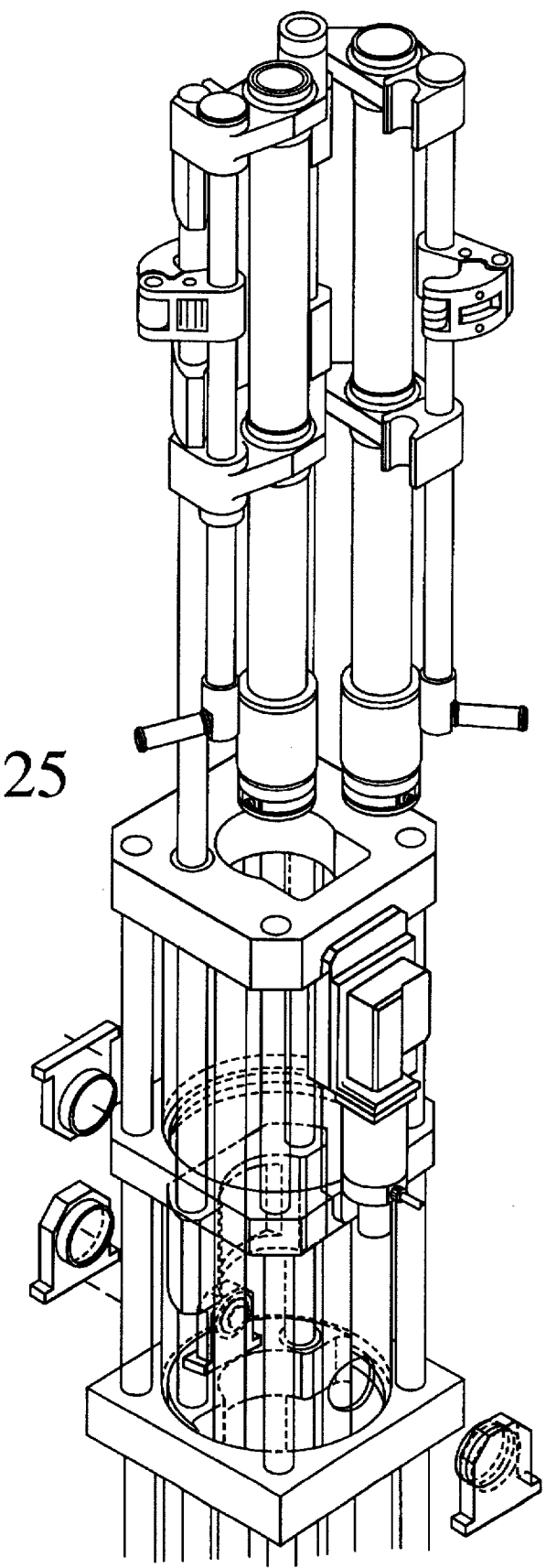

FIG. 25 provides details of one section of the schematic drawing shown in FIG. 24.

Figure 26:
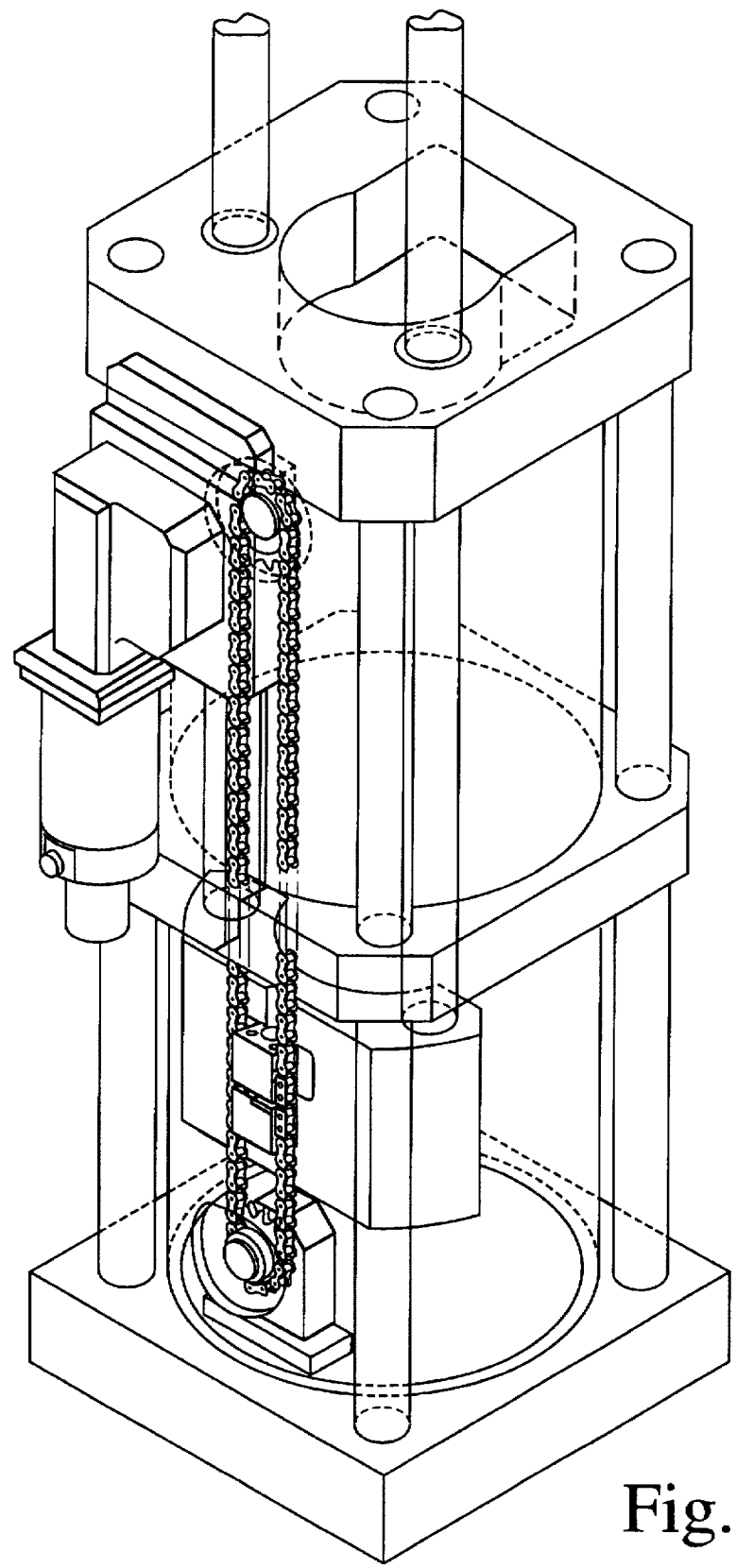

FIG. 26 provides additional details of a section of the schematic drawing shown in FIG. 24.

Figure 27:
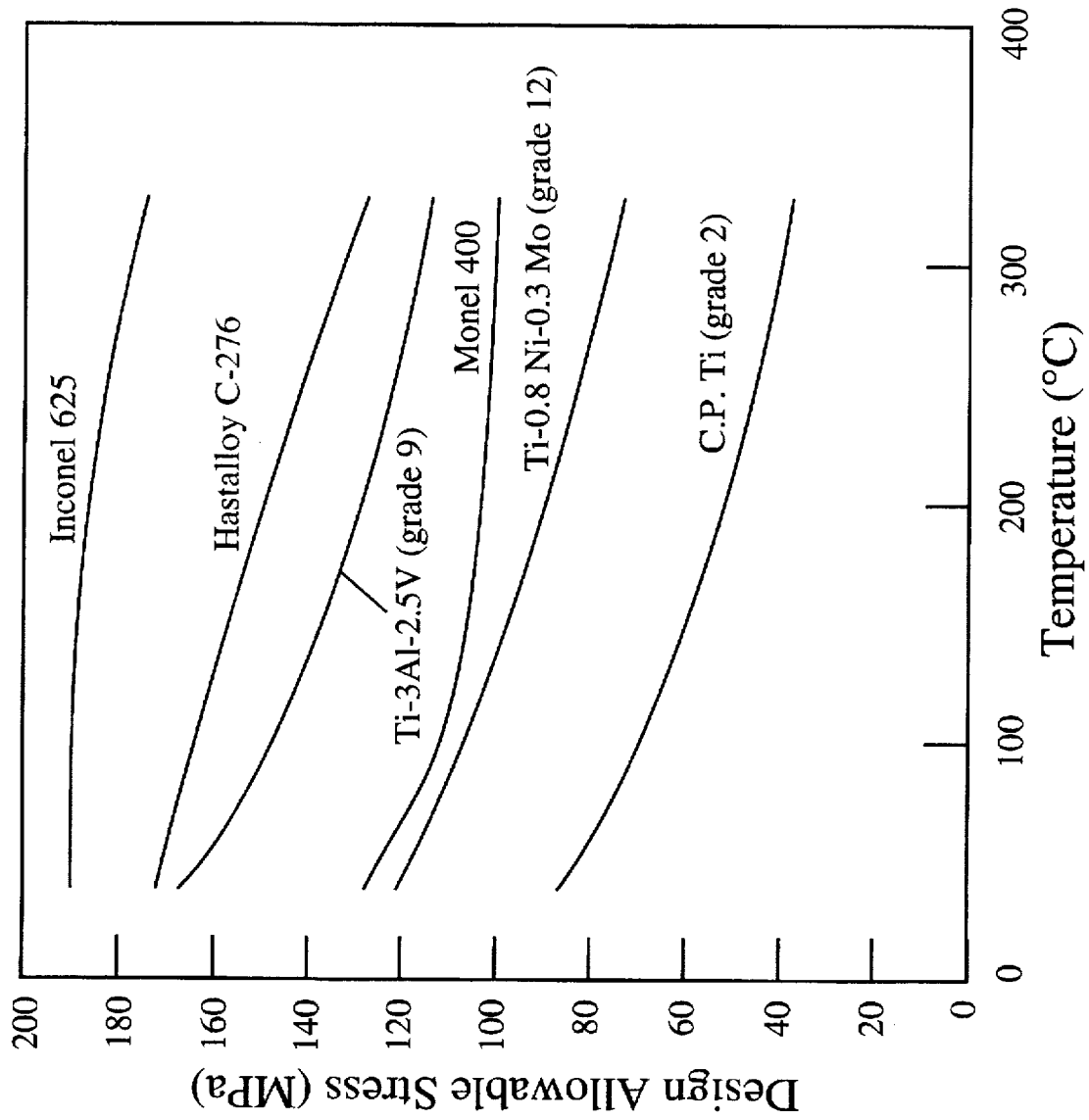

FIG. 27 is a chart which illustrates the design allowable stress of various alloys used in high temperature applications.

Figure 28:
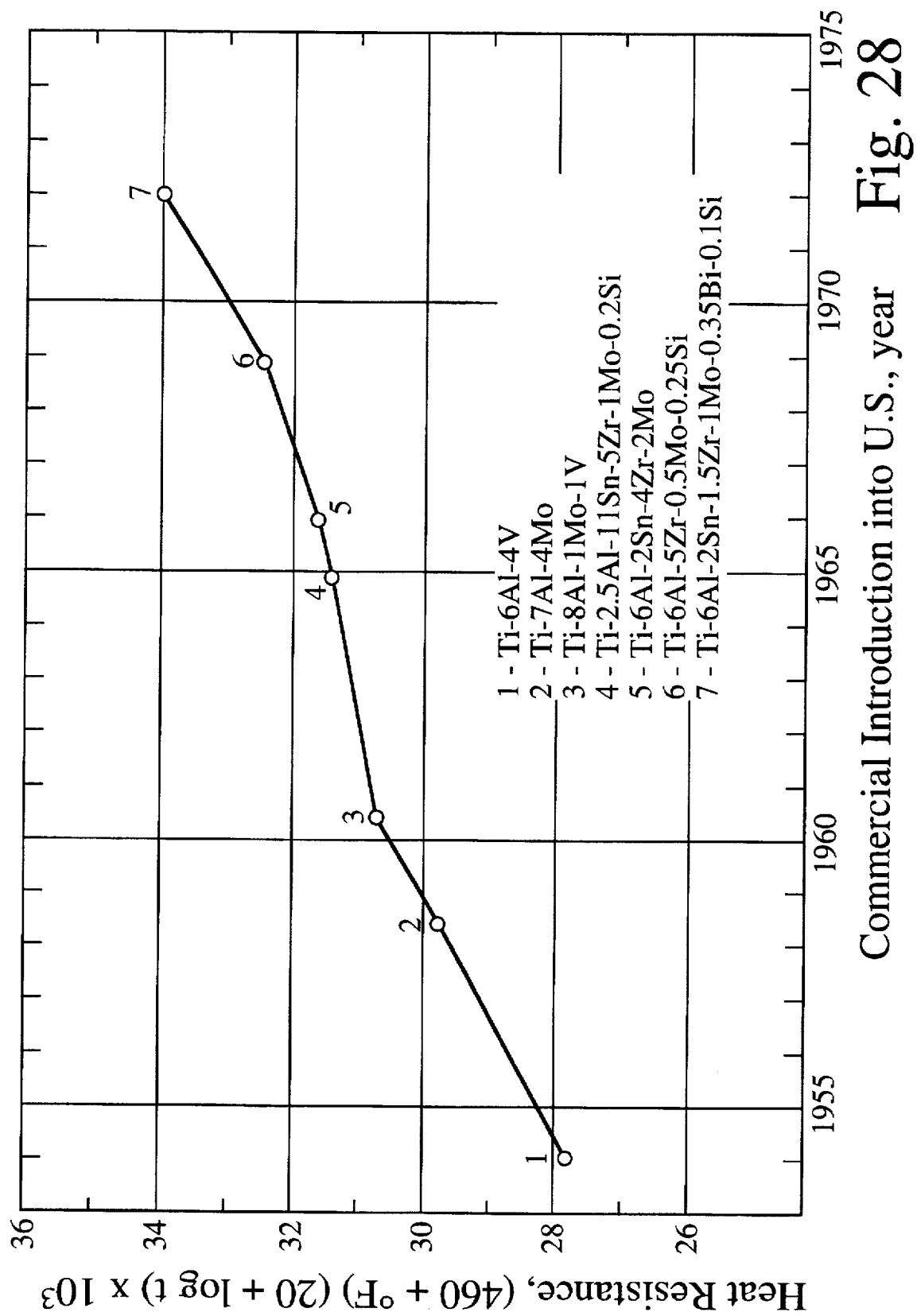

FIG. 28 is a diagram which illustrates the history of the commercial introduction of heat resistant titanium alloys in the United States.

Figure 29:
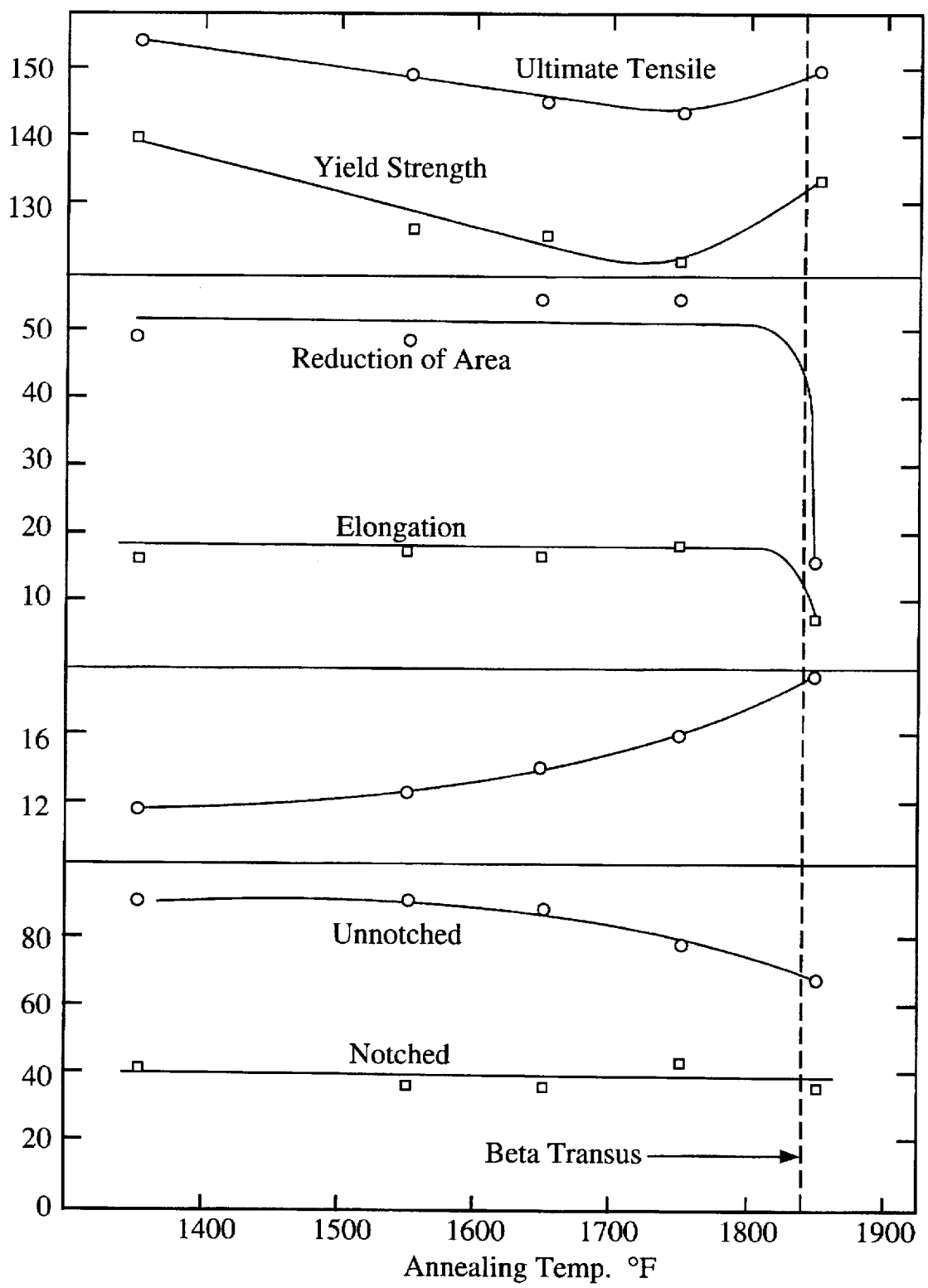

FIG. 29 depicts the various effects of annealing temperatures of an aerospace grade titanium alloy.

FIG. 30 is a chart that reveals the structural classes of titanium base alloys.

Figure 31:
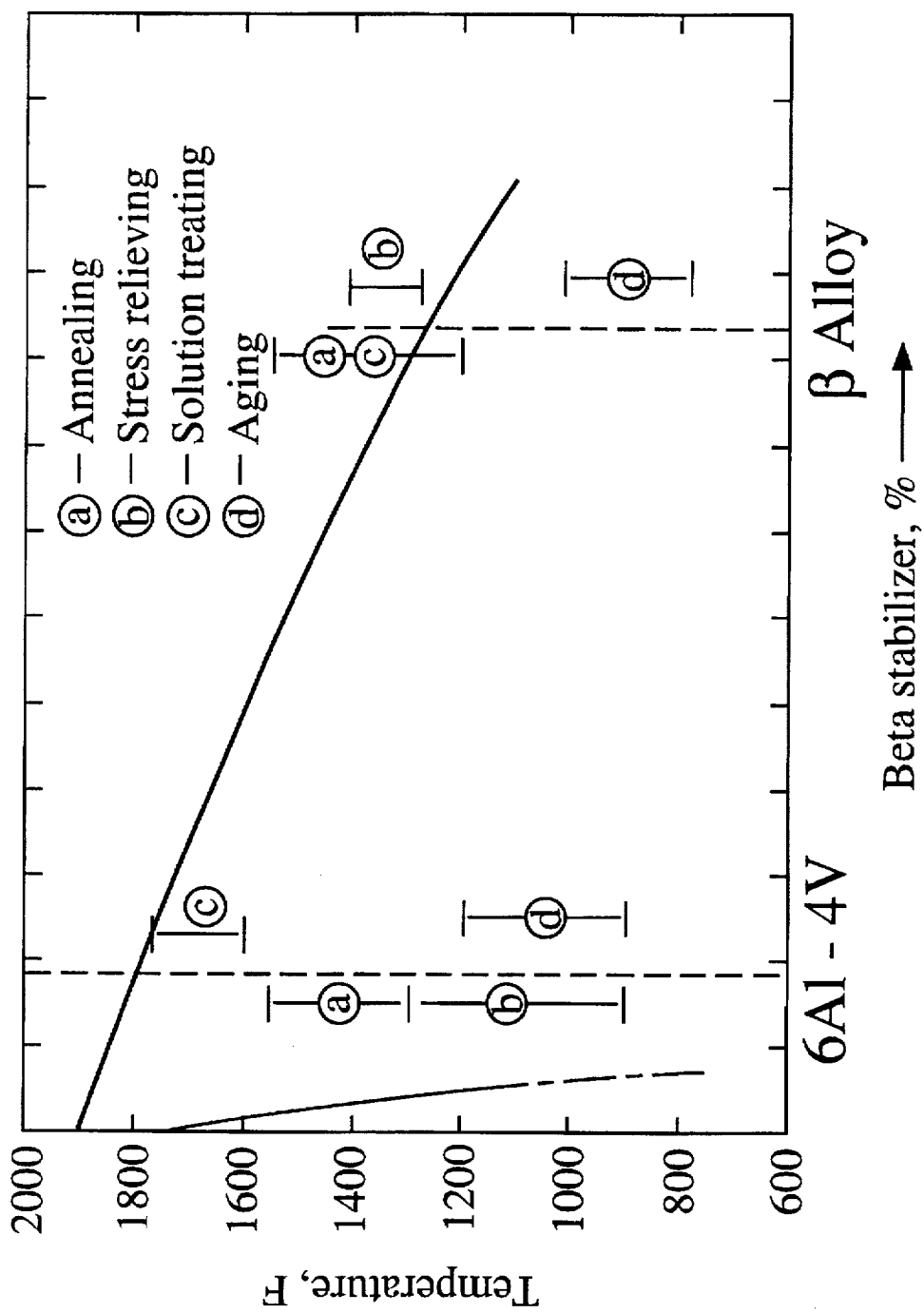

FIG. 31 is a diagram that provides typical heat treatments of alpha-beta and beta titanium alloys.

DETAILED DESCRIPTION OF PREFERRED & ALTERNATIVE EMBODIMENTS

The Sizing Tool

Figure 2A:
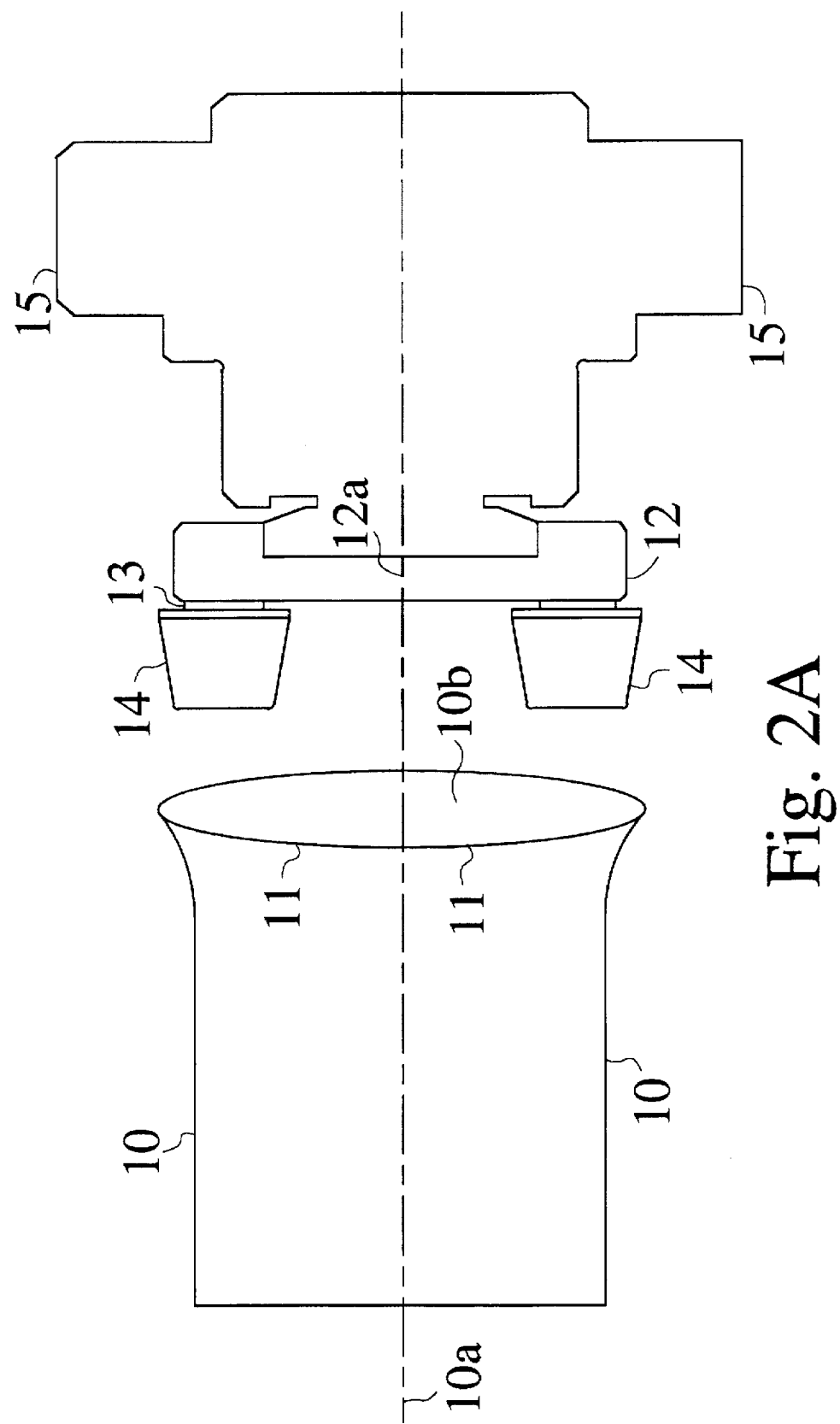
FIG. 2A is a side schematic view of the High-Precision Sizing Tool System which shows two rollers that have formed a precisely flared surface at the end of a cylindrical workpiece.

FIG. 1 depicts a conventional "pie-die" spreader which is described above in the background section. FIG. 2A presents a schematic illustration of a hollow cylindrical titanium, Inconel™, or hybrid stainless steel metal tube 10 and the Sizing Tool. The tube 10 has an axis of revolution 10a that extends through its central aperture 10b. The present invention is capable of forming either a flared or reduced surface 11 at the end of tube 10. In this specification, the term "flared" generally refers to a surface which opens out or is larger than some reference surface, such as the surface 11 shown in FIG. 2A at the end of tube 10. In contrast, the term "reduced" is generally employed to connote a constricted or diminished dimension.

The titanium used for many aerospace applications, such as specified by Boeing Inc. of Seattle, Wash., for use with the tube 10 in the present invention, is typically a Grade II titanium alloy, which starts as sheet/strip stock in accordance with AMS and U.S. military specification standards MIL-T-9046, AB-1, (Ti-6Al-4V). The tensile properties of this titanium alloy for which the present invention is designed are presented below:

TABLE ONE

| Constituent | Grade II(Ti-6Al-4V) Titanium |
| --- | --- |
| Yield Strength (PSI) | 40,000 to 60,000 |
| Ultimate Strength (PSI) | 50,000 minimum |
| Elongation Percent | 20 minimum |

The acceptable chemical analysis of this titanium alloy by Boeing Inc. is shown below:

TABLE TWO

| Constituent | Grade II |
| --- | --- |
| Titanium | 99.2 percent minimum |
| Hydrogen | 0.006 percent (60 ppm) maximum |
| Oxygen | 0.14 percent (1400) maximum |
| Iron | 0.20 percent maximum |

One distinct feature of titanium alloys, such as that specified for applications by Boeing Inc., is their high degree of ductility, which proves to be challenging for fabricated tubing assemblies. The present invention is designed to extensively and precisely work harden these ductile alloys into a precise and permanent geometry which can then be welded into a larger aerospace structure.

FIG. 2A also depicts a mounting plate 12 connected to bearings 13 that each support a roller 14. Plate 12 has an axis of revolution 12a that extends through its center. Axis 12a is colinear with axis 10a that extends through the center of the workpiece 10. The mounting plate 12 and rollers 14 are held by a tool mount assembly 15, which may be viewed in greater detail in FIGS. 4 and 6. The tool mount assembly 15 may include either the Sizer Tool, or the Cutter Tool, which is described below. In the preferred embodiment of the invention, the workpiece 10 is stationary and the plate 12 and rollers revolve around axes 10a and 12a. In an alternative configuration, the workpiece rotates and the Sizing Tool remains stationary. While the preferred embodiment utilizes eight rollers 14, any number of rollers 14 may be utilized to match the needs presented by a particular workpiece 10. While the typical workpiece 10 is a hollow tube of exotic aircraft metal such as titanium or stainless steel that resembles a right circular cylinder, any number of structural end shapes, including those having elliptical and oval cross-sections, may be formed using the present invention. The workpiece can be composed of any material which is susceptible to deformation under a gradual and repeated radial force.

Figure 2B:
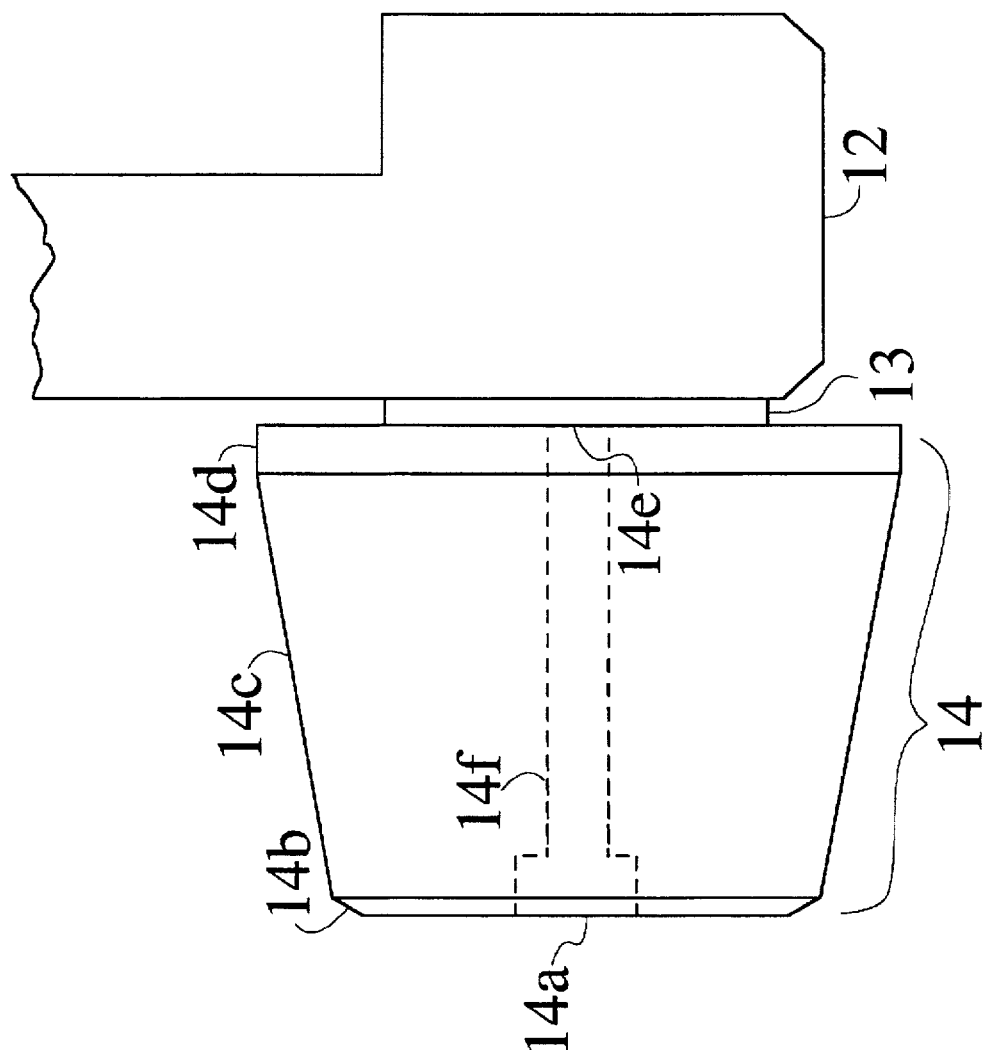
FIG. 2B is an enlarged side view of one of the rollers depicted in FIG. 1.

As best shown in FIG. 2B, each roller 14 includes a from surface 14a, a bevel 14b, a work surface 14c, a side flat surface 14d, and a back surface 14e. The work surface 14c of each roller 14 may be formed in a wide variety of profiles. In many of the multiple embodiments of the invention, the work surface 14c is a simple linear taper that is inclined ten to fifteen degrees to axes 10a and 12a. The work surface may also be curved to produce different flared or reduced surfaces on the workpiece 10. In the most preferred embodiment, the roller taper is ten degrees. A screw 14f runs through the center of each roller 14 to secure it to its respective bearing 13. A disc-shaped front plate (not shown) may be secured to one or more of the front faces 14a of the rollers 14 to provide added strength to the Sizing Tool. The preferred embodiment utilizes rollers having a diameter which insures that the edges between the beveled surfaces 14b and the work surfaces 14c almost touch. This configuration insures that the workpiece will experience the most gradual and gentle level of multiple reverse bending.

Figure 2C:
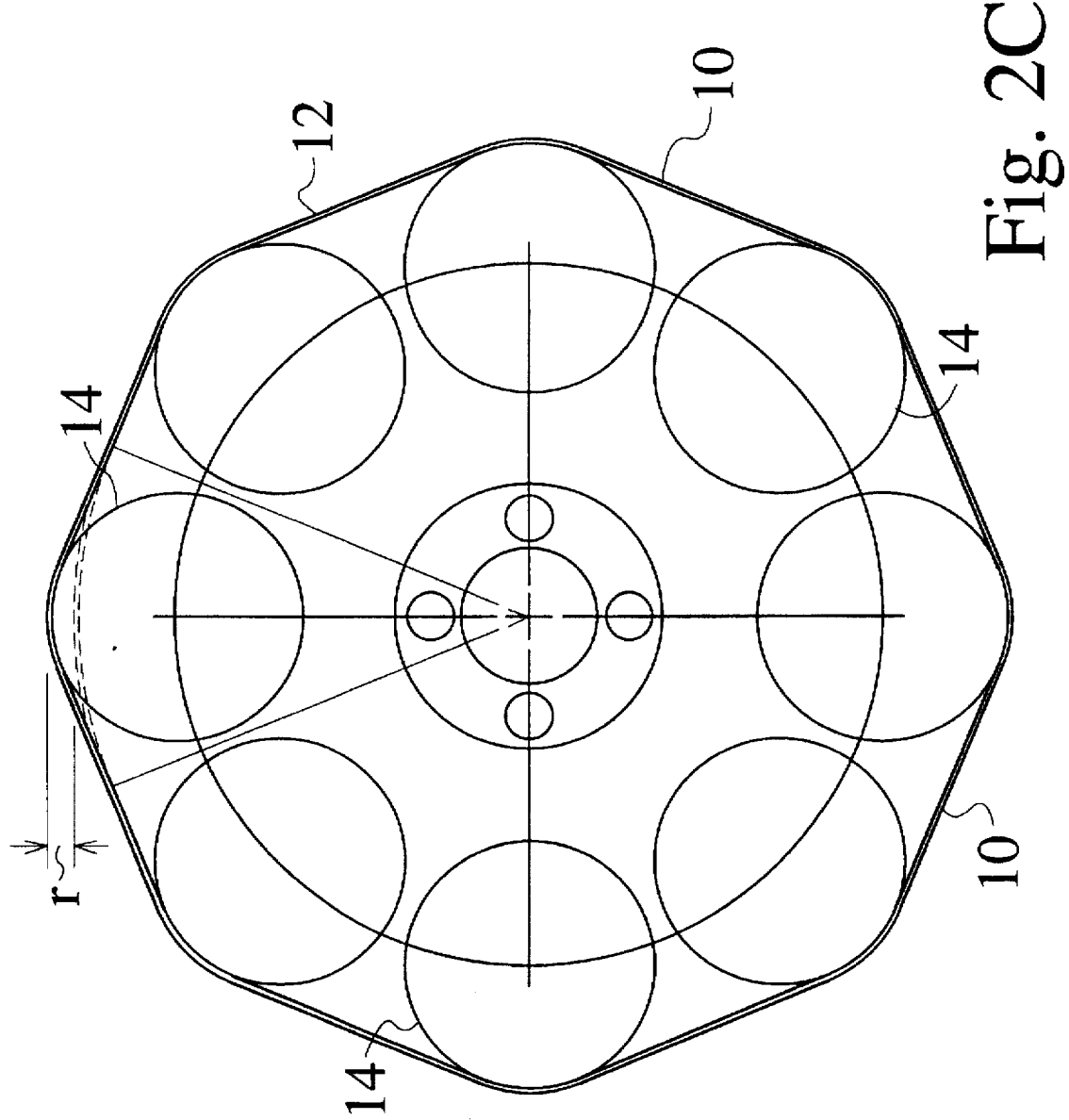
FIG. 2C is a front view of the preferred embodiment of the invention which illustrates the multiple forward and reverse bending method.

FIG. 2C provides a front view of the present invention which illustrates the novel multiple forward and reverse bending method. Each time each roller 14 makes one revolution around the inside of the workpiece 10, each spot on the workpiece undergoes a differential radial deflection that results from the combined outward and inward flexing caused by the rollers 14. Each roller 14 pushes out the tube 10 and creates an arc centered at the point which coincides within the longest extent of radial deflection. This repeated dynamic flexing is graphically delineated in FIG. 2C by the reference label "δr".

FIGS. 2D through 2K are side views of rollers that exhibit illustrative examples of the various work surfaces that may be utilized with the present invention.

FIG. 2L is a schematic diagram of one moving roller 14 impinging upon a workpiece 10. The illustration provided by FIG. 2L is based on a portion of the drawing supplied by FIG. 2C. As the roller 14 rotates in a clockwise direction, all the points along the inner circumference of the hollow cylinder 10 experience alternating forward (+) and reverse (−) bending. The rollers 14 alternately cause the tube wall 10 that is in contact with each roller to flex in opposite directions, while gently traversing the roller curvature.

FIG. 2M presents a side view of a sized titanium, Inconel™, or hybrid stainless steel cylinder 10. During the sizing operation, each roller 14 engages the tube 10 and imparts a gentle progressive flexuring of the tube end. These repeated forces cause the small crystals or fibers of metal at the end of the tube to pass their yield point. The repeated flexure forces enhance the ability of the metal fibers to resist the elastic forces that would naturally tend to force the tube back to its original shape. Once enough mechanical strength and stability is achieved through repeated flexure, the tube retains its new shape and is less likely to tear or crack along the area of the bend. Reference numerals 11a and 11c indicate the points of minimum and maximum deflection caused by the dynamic flexure action of the rollers 14. The point on the flared tube wall that experienced the minimum deflection, 11a, is the most mechanically stable area of the entire sized surface. This mechanical stability reduces the natural tendency of the tube to spring back to its original position. The very end of the flared portion of the tube, 11c, which experienced the most bending forces, is less stable and is more susceptible to the elastic "springback" forces inherent in the metal. Each crystal or fiber of metal along the flare from 11a to 11c is included within the region labeled 11b. Each small section of metal in this area 11b is progressively more stable than the one that preceded it. Each point on the flared end supports its neighbor toward the end of the flare, and preserves the mechanical stability of the entire shape.

FIG. 3 provides a from view of a roller plate 12 bearing eight cam rollers 14. This assembly is held together by a set of alternating screws and dowels 17.

FIG. 4 is a cross-sectional view of the tool mount assembly 15 that includes the plate 12 and rollers 14. A housing 18 encloses a retainer plate 20 and a rotor 22 that, in turn, extends into a drive shaft 24. The tool mount assembly 15 typically rotates the plate 12 and rollers 14 at fifty to two hundred revolutions per minute. The operational angular velocity of the plate 12 and rollers 14 is determined by the toughness or thickness of the workpiece. Each material may be machined using a preselected, appropriate speed. This advantage is not available when conventional static spreaders are employed.

FIGS. 5a, 5b, 5c, and 5d exhibit detailed views of the rollers 14 and roller plate 12. A stud 14g supports anti-friction bearings (not shown) that, in turn, support the tapered roller 14. A retainer 14h and a screw 14f hold the roller 14 on plate 12.

FIG. 6 is a cross-sectional rendering of the motor assembly 16 which drives the tool mount assembly 15. A drive motor 26 turns a spur gear 28, which, in turn, drives a ring gear 30. A mounting flange 32 is enclosed within gear box housing 34 and side stiffening plate 36. Two ball shafts 38 on either side of the motor assembly 16 slide within ball bushings 40 that are supported by ball bushing mounts 42 and ball shaft mounts 44. The ball shafts 38 are enclosed by extensions 46. Ball shaft mounts 44 are attached to a base plate 48. Either the Sizer Tool or the Cutter Tool can be mounted on a motor mount side plate 50. FIG. 6 shows the roller plate 12 in its full thrust position for the sizing operation, which is delineated by reference numeral 52. The full thrust position for the cutter tool operation is marked by reference numeral 54. A tail stock 56 is mounted on the ball shaft 38. The ball shaft 38 maintains concentricity with the tool spindle center-line (axis of revolution) 12a. The tail stock 56 holds the tube 10. Inserts 58 having various diameters (best seen in FIG. 8a) can accommodate many different sizes of tubes 10.

FIG. 7 is a front cross-sectional view of the apparatus shown in FIG. 6.

FIG. 8 provides from and side views of a workpiece frame. The motor mount sliding plate 50 moves back and forth on ball bushing 40 and ball shaft 38. This motion permits the tool mount assembly 15 which includes the rollers 14 to move in and out of the workpiece 10. This motion is limited by adjustable stops, guides, and gauge blocks (not shown) which set the thrust positions for each tool and which provide precise positioning for sizing and cutting.

FIG. 9 includes several views of a tool advance mechanism. FIG. 9(a) portrays a thrust pivot frame 70 that supports a thrust mechanism 72 which includes a pivot hook 74 and a handle 76. The various handle positions are marked by reference numerals 76a through 76e which indicate the corresponding operational condition of the thrust mechanism for each position:

TABLE THREE

| Handle Position | Thrust Mechanism Operation |
|---|---|
| 76a | Idle |
| 76b | Initial contact |

TABLE THREE-continued

| Handle Position | Thrust Mechanism Operation |
|---|---|
| 76c | Initial thrust |
| 76d | Half thrust |
| 76e | Full thrust |

Advantages of the Sizing Tool

The novel dynamic bending method utilized by the present invention produces results which are superior those achieved by conventional static spreader devices. The Sizing Tool is not only much faster than the older pie-die spreader, but does not require lubrication or cooling of any kind. By avoiding the lubricants that are generally used in conventional devices that form into a die or mold, the present invention eliminates the need to perform expensive and nettlesome clean-up operations of exotic metals. The invention claimed below may also be used to form an inward flare or can be used with an induction heating device to assist in the deformation of the hollow tube. Unlike the older static spreader devices, the Sizing Tool places a flared edge exactly where it is required. Older machines can only attempt to form a permanent flare, and unusable excess areas must then be trimmed from the tube. The present invention also affords an additional engineering advantage by allowing a technician to fabricate a flare on a relatively short workpiece. Previous machines require so much force to impose a deformation on a hollow tube that a short workpiece would be unable to withstand the very large forces required to create the flare. Since the Sizing Tool applies the deflection energy via the dynamic sizing method described above, much lower forces are needed and shorter workpieces are readily sized. Centering the workpiece is also much easier to accomplish using the present invention, as compared to the pie-die spreader.

The Cutting Tool

FIG. 12 reveals the location of the cutter advance drive motor 80.

FIG. 17 reveals an exploded perspective view of a Cutting Tool Bit Drive Assembly 100. A tool bit holder subassembly 101 includes a body 101A and a bit holder 101B. The bit holder 101B is held into body 101A by screws, and holds tool bit 101D. A rear cam roller slot 101E is formed on the rear face of body 101A, and engages a roller 107B. The entire tool bit holder subassembly 101 is held in place by a pair of tool bit holder clamp guides 102. Subassembly 101 slides back and forth in slotted guide provided by the clamp guides 102, and is guided and actuated by the engagement of cam roller 107B and slot 101E. The guides 102 are held by machine screws against a tool bit guide clamp mount 104A and a machine head mounting plate 104B. A bearing 103 is enclosed by clamp mount 104A and mounting plate 104B. The mounting plate 104B is coupled to a rotor 105, which includes a forward portion 105A, a step portion 105B, and a rear portion 105C. The elements described above between and including the tool bit holder 101 back through and including the mounting plate 104A are specific only to the Cutting Tool. The rotor 105 is attached to the center of a rotor ring gear 106 that is driven by a smaller pinion gear (not shown in FIG. 17). The pinion gear, in turn, is powered by a main motor which provides rotary energy to both the Sizer and the Cutting Tool. In an alternative embodiment, the ring gear 106 may be replaced by a belt or some other suitable traveling or rotating energy transfer device.

A critical transmission means which controls the motion of the Cutting Tool is a tool bit advance cam shaft 107, which rotates at the same speed as rotor ring gear 106. This shaft 107 has a central portion 107A and an eccentric cam roller 107B mounted on a forward-facing flange 107C. The opposite end of shaft 107 terminates in a spiral channel cup 107D. This cup 107D includes at least one spiral guidance channel 107E. The forward-facing flange 107C also engages bearing 103 at the front end. In the preferred embodiment of the invention, the spiral channels 107E are formed at an angle of approximately thirty degrees from the central axis of shaft 107. The shaft 107 is received by another critical transmission means in the Cutting Tool, a cam pin housing longitudinal guide cup 108. Cup 108 is attached to the rotor ring gear 106, and includes a cylindrical body portion 108, a front face 108B faces rotor ring gear 106, and a hole 108C that leads to a central chamber 108D. The end of the cup 108 which lies at the opposite end from the front face 108B includes at least one straight longitudinal guidance slot 108E. The slots 108E are formed at the rear end of the cup 108 which defines a rear opening 108F that receives a cam actuating housing 109. This housing 109 includes a body portion 109A, a front face 109B, a central chamber 109C, a rear flange 109D, and a cam pin hole 109E. A cam pin 110 is seated in cam pin hole 109E. The cam pin 110 has an upper portion 110A, a middle portion 110B that extends through housing 109, and a lower portion 110C that extends into the central chamber 109C enveloped by the housing 109. A rear fitting 110D fits over the flange portion 109D of housing 109. Bearing 111 engages the aft end of shaft 107 and the forward end of lead screw shaft 115D. A lead screw nut 112 and a traveling thrust bearing 113, that, in turn, are received by a control rod base 114 which includes a front flange 114A and a holes 114B. A lead screw shaft 115 fits through the rod base 114 and includes a rear portion 115A that has a slotted end 115B. The shaft 115 also includes a threaded portion 115C and a forward reduced portion 115D that engages bearing 111. A pair of longitudinal position control rods 116 are located parallel to shaft 115 and are received by holes in a ring bearing retainer 118 that is attached to a shaft bearing retainer 117. A bearing lock ring 119 is coupled to a fixed thrust bearing 120 by a lock ring pin 121. A motor mount 122 having a front face 122A and a flange portion 122B surrounds an advance mechanism drive motor shaft 123 that includes a motor body 123A, a front flange 123B, a forward projection 123C, and a pin 123D. The shaft 123 is coupled to an adjustable optical sensor 124 which provides longitudinal distance control. The motion of the shaft 123C is governed by an optical speed control 125 which includes an adjustable mounts 126, an actuator 127 coupled to control rod 116, and an encoder board 128.

The Cutting Tool is rotated by the action of the pinion gear, which engages ring gear 106. The advance cam shaft 107 provides the radial motion which provides precise control of the cutting action of the tool bit 101D. The cam roller assembly 107B passes through the center of the ring gear 106, cam roller 107B, rotor 105, mounting plate 104B, clamp mount 104A, and bearing 103 and is engaged by slot 101E. The circular movement of cam roller 107B at the end of shaft 107 forces the bit holder 101B to move in guides 102 and body 101A.

The advanced camshaft 107 rotates at the same speed as the ring gear 106. While the ring gear 106 is rotating at a given speed, shaft 107 advances or retards the speed of the shaft slightly as dictated by pin 110C. This slight increase or decrease in speed (forward or reverse motion) of cam shaft 107 actuates cam roller 107B in groove 101E. Pin 110C is forced forward and backward by lead screw 115 and drive motor 123.

After the Cutting Tool has been moved inside a hole in a workpiece, the in and out radial motion of the holder assembly 101B carries the bit 101D into the interior surface of the metal bore which is to be cut. The shaft 107, which moves the bit holder 101B, is rotated by the twisting motion of the spiral channel 107D. The spiral guidance channels 107E are designed to receive the lower portion 110C of cam pin 110, which is held by cam actuating housing 109. When housing 109 is moved forward, it slides forward but does not rotate, since cam pin 110 is constrained to move along a straight line of travel by longitudinal slot 108E in guide cup 108. Since the cam pin 110 can not rotate, the lower portion of the cam pin 110C that extends into spiral channel 107E forces shaft 107 to rotate. The spiral channels 107E act as a transmission which converts the back-and-forth translation motion of the housing 109 and the cam pin 110 that it holds into precise rotational motion that governs the radial action of the cam roller 107B.

FIG. 6 shows a rotary drive motor 26 which provides the spinning motion for the tool bit holder 101B.

FIGS. 12, 14(a) and 16 exhibit a cutter advance drive motor 80 which provide the radial motion for the tool bit holder 101B.

The Cutting Tool utilizes an actuator 127 and an optical sensor 124 to control the longitudinal motion of the tool bit. The actuator 127 is fixed on one end of the control rod 116. The optical sensor 124 is electrically connected to the cutter advance drive motor 80. The actuator 127 is disposed to move past and to trigger the optical sensor 124 when the control rod 116 moves a predetermined distance.

The control rod 116 and the control rod base 114 regulate the transverse action that moves the single cutter tool bit 101D in and out of the center of the hollow tube 10 that is to be cut using the invention. As best seen in FIG. 17, the control rods 116 are located parallel to a lead screw shaft 115. The control rods 116 are received by holes in a ting bearing retainer 118 that is attached to a shaft bearing retainer 117. The end of the rods 116 that is opposite the single cutter tool bit 101D fit into actuators 127. The pins on the actuators 127 engage optical sensors 124. When the single cutter tool bit 101D reaches a predetermined location within the hollow tube, the actuators 127 located on the control rods 116 cause the optical sensors 124 to terminate the action of the motor 80 that drives the transverse motion.

The Cutting Tool may be used to cut metals, plastics, composites and other materials. Cuts may be made from the inside of a tubular work piece toward the outside, or from the outside into tubular a work piece.

FIG. 27 is a chart which illustrates the design allowable stress of various specialty alloys used in high temperature applications.

FIG. 28 is a diagram which illustrates the history of the commercial introduction of heat resistant titanium alloys in the United States.

FIG. 29 depicts the various effects of annealing temperatures of an aerospace grade titanium alloy.

FIG. 30 is a chart that reveals the structural classes of titanium base alloys.

FIG. 31 is a diagram that provides typical heat treatments of alpha-beta and beta titanium alloys.

The High-Precision Cutting Tool System disclosed and claimed in this Patent Application constitutes a major step forward in the machine tool art and will provide a valuable tool for designers and manufacturers of aircraft and aerospace vehicles.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various materials that have been disclosed above are intended to educate the reader about one preferred embodiment, and are not intended to constrain the limits of the invention or the scope of the claims. Although the preferred embodiments have been described with particular emphasis on titanium alloys, INONEL™ and stainless steel, the present invention may be beneficially implemented with other materials such as plastics or composites. The List of Reference Characters which follows is intended to provide the reader with a convenient means of identifying elements of the invention in the specification and drawings. This list is not intended to delineate or narrow the scope of the claims.

LIST OF REFERENCE NUMERALS

FIG. 1
A Conventional pie-die spreader tool
B,C,D,E Spreader tool sections
B',C',D',E' Positions of displaced sections
F Center
G Radial displacement of sections
  FIGS. 2A, 2B, & 2C
10 Cylinder
10a Axis of revolution of cylinder
10b Central aperture
11 Flared end of cylinder
12 Plate
12a Tool spindle center-line (Axis of revolution)
13 Bearing
14 Roller
14a Front surface
4b Bevel
14c Work surface
14d Side flat surface
14e Back surface
14f Screw
15 Tool Mount Assembly
16 Motor assembly
δr Radial bending
  FIGS. 3 & 4
17 Alternate screw & dowel
18 Housing
20 Retainer plate
22 Rotor
24 Shaft
  FIG. 5
14g Stud
14h Retainer
  FIGS. 6 & 7
26 Drive motor
28 Spur gear
30 Ring gear
32 Mounting flange
34 Gear box housing
36 Side stiffening plate
38 Ball shaft
40 Ball bushing
42 Ball bushing mount
44 Ball shaft mount
46 Extension for tail stock support
48 Base plate
50 Motor mount slide plate
52 Roller full thrust position
54 Cutter full thrust position
  FIG. 8
56 Workpiece frame
58 Inserts
60 Hinge
62 Hinge motion limiter
64 Lever
66 Latch
68 Ball shaft
  FIG. 9
70 Thrust pivot frame
72 Thrust mechanism
74 Thrust pivot hook
76 Handle
  Handle Positions:
76a Idle
76b Initial contact
76c Initial thrust
76d Half thrust
76e Full thrust
  FIG. 12
80 Cutter advance drive motor
  FIG. 17
100 Cutting Tool Drive Assembly
101 Tool bit holder subassembly
101A A Body
101B Bit holder
101C Slot
101D Bit
101E Rear cam roller slot
102 Tool bit holder guide clamp
103 Cam bearing
104A Tool bit guide clamp mount
104B Machine head mounting plate
105 Rotor
105A Forward portion of rotor
105B Step portion of rotor
105C Rear portion of rotor
106 Rotor ring gear
107 Cutter advance cam shaft
107A Central portion of shaft
107B Cutter advance eccentric cam roller
107C Cam roller flange
107D Spiral channel cup on advance cam shaft
107E Spiral guidance channel
108 Cam pin housing longitudinal guide cup
108A Body portion of guide cup
108B Front face
108C Front hole
108D Central chamber
108E Straight longitudinal guidance slot
108F Rear hole
109 Cam actuating housing
109A A Body of cam actuating housing
109B Front face
109C Central chamber of cam actuating housing
109D Rear flange
109E Cam pin hole
110 Cam pin
110A Upper portion of cam pin 110B Middle portion of cam pin
110C Lower portion of cam pin
110D Rear fitting
111 Lead screw bearing
112 Lead screw nut
113 Traveling thrust bearing
114 Control rod base
114A Front flange of control rod base
114B Hole in control rod base
115 Lead screw shaft
115A Rear portion of shaft
115B Slotted end of shaft
115C Threaded portion of shaft
115D Forward reduced portion of shaft
116 Longitudinal position control rod
117 Shaft bearing retainer
118 Ring bearing retainer
119 Bearing lock ring
120 Fixed thrust bearing
121 Lock ring pin
122 Motor mount
123 Cutter advance mechanism drive motor shaft
123A Body portion
123B Flange
123C Projection
123D Pin
124 Adjustable optical sensor for longitudinal distance control
125 Optical speed control
126 Optical sensor adjustable mount
127 Optical sensor actuator
128 Encoder board

What is claimed is:

1. A Cutting Tool for cutting a generally cylindrical metal tube (10) comprising:

a tool bit holder (101B);

said tool bit holder (101B) having a rear cam roller slot (101E);

a cutter advance drive motor (80);

a tool bit advance shaft (107A) having tool bit advance eccentric cam roller (107B) which fits within said rear cam roller slot (101E) and which provides precise radial displacement of said tool bit holder (101B);

said tool bit advance shaft (107A) being indirectly coupled to said cutter advance drive motor (80);

a single cutter tool bit (101D); said single cutter tool bit (101D) being held by said tool bit holder (101B);

a rotary drive motor (26); and a rotor (105) and a ring gear (106) coupled to said rotary drive motor to provide rotary motion for said tool bit holder (101B);

a control rod (116) and a control rod base (114); said control rod (116) being directly and mechanically coupled to said control rod base (114); and an actuator (127) and an optical sensor (124); said actuator (127) being fixed to one end of said control rod (116); said optical sensor (124) being electrically connected to said cutter advance drive motor (80); said actuator (127) being disposed to move past and to trigger said optical sensor (124) when said control rod (116) moves a predetermined distance.

2. A Cutting Tool as recited in claim 1, in which:

said tool bit advance cam shaft (107A) includes a roller (107B); and said roller (107B) being engaged by said rear cam roller slot (101E) for applying a circular twisting motion (R) which is converted to said radial displacement (D) of said tool bit (101D).

3. A Cutting Tool as recited in claim 1, in which:

said tool bit advance cam shaft (107A) includes a spiral channel (107E); and a cam pin (110);

said cam pin (110) having a lower portion (110C);

said spiral channel (107E) in said tool bit advance cam shaft (107) being adapted to receive said lower portion of said cam pin (110C).

4. A Cutting Tool as recited in claim 3, further comprising:

a lead screw (115);

said lead screw (115) being coupled to said cam pin (110);

said lead screw (115) for forcing said pin (110) forward and backward.

5. A Cutting Tool as recited in claim 4, further comprising:

a drive motor (123);

said drive motor (123) being coupled to said lead screw (115);

said drive motor (123) for supplying rotary power to said lead screw (115).

6. A Cutting Tool as recited in claim 5, further comprising:

an adjustable optical sensor and control (124, 125);

said adjustable optical sensor and control (124, 125) being coupled to said drive motor (123);

said adjustable optical sensor and control (124, 125) for sensing and controlling the action of said drive motor (123).

7. A Cutting Tool as recited in claim 1, in which:

said tool bit holder (101B) is held in place by a pair of tool bit holder clamp guides (102).

8. A Cutting Tool as recited in claim 7, further comprising:

a mounting plate (104B);

said mounting plate (104B) being coupled to said tool bit holder clamp guides (102).

9. A Cutting Tool as recited in claim 8, in which said rotor (105) is coupled to said mounting plate (104B) to transfer rotary power to said mounting plate (104B).

10. A Cutting Tool as recited in claim 3, in which:

said spiral channel (107E) is formed at an angle of approximately thirty degrees from the central axis of said tool bit advance cam shaft (107).

* * * * *